(12) United States Patent
Hamada

(10) Patent No.: US 12,200,256 B2
(45) Date of Patent: Jan. 14, 2025

(54) DELIVERY APPARATUS AND DELIVERY METHOD

(71) Applicant: SONY GROUP CORPORATION, Tokyo (JP)

(72) Inventor: Toshiya Hamada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/921,619

(22) PCT Filed: Apr. 27, 2021

(86) PCT No.: PCT/JP2021/016721
§ 371 (c)(1),
(2) Date: Oct. 26, 2022

(87) PCT Pub. No.: WO2021/230068
PCT Pub. Date: Nov. 18, 2021

(65) Prior Publication Data
US 2023/0179798 A1 Jun. 8, 2023

(30) Foreign Application Priority Data
May 13, 2020 (JP) .................................. 2020-084666

(51) Int. Cl.
*H04N 19/597* (2014.01)
*H04N 13/111* (2018.01)
(Continued)

(52) U.S. Cl.
CPC ......... *H04N 19/597* (2014.11); *H04N 13/111* (2018.05); *H04N 13/161* (2018.05); *H04N 19/124* (2014.11); *H04N 19/513* (2014.11)

(58) Field of Classification Search
None
See application file for complete search history.

(56) References Cited

U.S. PATENT DOCUMENTS

| 2017/0155885 | A1* | 6/2017 | Selstad | G06T 7/20 |
| 2019/0141311 | A1* | 5/2019 | Lee | G06T 15/08 |
| 2019/0221029 | A1* | 7/2019 | Yoneda | G06T 7/70 |

FOREIGN PATENT DOCUMENTS

| JP | 2001-076180 A | 3/2001 |
| JP | 2007-520925 A | 7/2007 |

OTHER PUBLICATIONS

Liu, et al., "Enhancing Video Encoding for Cloud Gaming Using Rendering Information", IEEE, Transactions on Circuits and Systems for Video Technology, vol. 25, No. 12, Jun. 26, 2015, pp. 1960-1974.

(Continued)

*Primary Examiner* — Clifford Hilaire
(74) *Attorney, Agent, or Firm* — CHIP LAW GROUP

(57) ABSTRACT

Provided is a delivery apparatus including a viewpoint information acquisition unit to acquire viewpoint information of a user in real-time, a rendering unit to perform rendering processing on three-dimensional spatial data in real-time on the basis of the viewpoint information to generate two-dimensional video data corresponding to a field of view of the user, a parameter generation unit to generate an encoding parameter on the basis of a parameter regarding the rendering processing, an encoding unit to perform encoding processing on the two-dimensional video data in real-time on a basis of the encoding parameter to generate delivering data, and a delivery unit to deliver the delivering data to a client.

13 Claims, 17 Drawing Sheets

(51) Int. Cl.
*H04N 13/161* (2018.01)
*H04N 19/124* (2014.01)
*H04N 19/513* (2014.01)

(56) References Cited

OTHER PUBLICATIONS

Fechteler, et al., "Accelerated video encoding using render context information", IEEE, International Conference on Image Processing, Sep. 26-29, 2010, pp. 2033-2036.
International Search Report and Written Opinion of PCT Application No. PCT/JP2021/016721, issued on Jul. 13, 2021, 09 pages of ISRWO.

* cited by examiner

FIG. 10

| REGION ID | REGION (CLOSED REGION SURROUNDED BY STRAIGHT LINES CONNECTING POINTS) | RESOLUTION VALUE (HORIZONTAL RESOLUTION AND VERTICAL RESOLUTION) [NUMBER OF PIXELS PER UNIT] |
|---|---|---|
| 1 | (xr11, yr11), (xr12, yr12), ... | (rh1, rv1) |
| 2 | (xr21, yr21), (xr22, yr22), ... | (rh2, rv2) |
| 3 | (xr31, yr31), (xr32, yr32), ... | (rh3, rv3) |
| ... | ... | ... |

FIG.11

| OBJECT ID | REGION (CLOSED SPACE SURROUNDED BY STRAIGHT LINES CONNECTING POINTS) | CENTER POSITION OF OBJECT | MOTION VECTOR OF CENTER POSITION OF OBJECT |
|---|---|---|---|
| 1 | (xp11, yp11), (xp12, yp12), ... | (xc1, yc1) | (xm1, ym1) |
| 2 | (xp21, yp21), (xp22, yp22), ... | (xc2, yc2) | (xm2, ym2) |
| 3 | (xp31, yp31), (xp32, yp32), ... | (xc3, yc3) | (xm3, ym3) |
| ... | ... | ... | ... |

FIG.12

| VALUE | MEANING INDICATED BY VALUE |
|---|---|
| 0 | NO DIFFERENCE FROM PREVIOUS FRAME |
| 1 | THERE IS DIFFERENCE FROM PREVIOUS FRAME |

FIG.13

| REGION ID | COORDINATES OF TWO POINTS REPRESENTING RECTANGLE | QP VALUE |
|---|---|---|
| 1 | (xq11, yq11)-(xq12, yq12) | 30 |
| 2 | (xq21, yq21)-(xq22, yq22) | 25 |
| 3 | (xq31, yq31)-(xq32, yq32) | 30 |
| ⋮ | ⋮ | ⋮ |

FIG.14

| REGION ID | COORDINATES OF TWO POINTS REPRESENTING RECTANGLE | MOTION VECTOR |
|---|---|---|
| 1 | (xv11, yv11)-(xv12, yv12) | (xo1,yo1) |
| 2 | (xv21, yv21)-(xv22, yv22) | (xo2,yo2) |
| 3 | (xv31, yv31)-(xv32, yv32) | (xo3,yo3) |
| ⋮ | ⋮ | ⋮ |

DELIVERY APPARATUS AND DELIVERY METHOD

CROSS REFERENCE TO RELATED APPLICATIONS

This application is a U.S. National Phase of International Patent Application No. PCT/JP2021/016721 filed on Apr. 27, 2021, which claims priority benefit of Japanese Patent Application No. JP 2020-084666 filed in the Japan Patent Office on May 13, 2020. Each of the above-referenced applications is hereby incorporated herein by reference in its entirety.

FIELD

The present disclosure relates to a delivery apparatus and a delivery method.

BACKGROUND

In recent years, omnidirectional video, which is captured by an omnidirectional camera or the like and can look around in all directions, has also been subjected to delivery. More recently, techniques for delivering six degrees of freedom (6DoF) video (also called 6DoF content) have been developing. The 6DoF allows a viewer (user) to look in all directions (free selection of line-of-sight direction) and to shift freely in three-dimensional space (free selection of viewpoint position). Such 6DoF content is a dynamical reproduction of three-dimensional space with one or a plurality of three-dimensional objects depending on the viewer's viewpoint position, line-of-sight direction, and viewing angle (viewing range) every time.

Such video delivery requires the dynamical adjustment (rendering) of video data presented to the viewer depending on the viewing range of the viewer. An example of such a technique can include the technique disclosed in Patent Literature 1 below.

CITATION LIST

Patent Literature

Patent Literature 1: JP 2007-520925 A

SUMMARY

Technical Problem

However, this traditional technique does not address the limitations in encoding video data to be delivered (two-dimensional video data) in real-time and with high image quality on the basis of the viewer's viewpoint position, line-of-sight direction, and viewing angle varying every moment.

Thus, the present disclosure provides a delivery apparatus and a delivery method capable of encoding video data to be delivered in real-time and with high image quality.

Solution to Problem

According to the present disclosure, a delivery apparatus is provided. The delivery apparatus includes: a viewpoint information acquisition unit configured to acquire viewpoint information regarding a viewpoint of a user in real-time; a rendering unit configured to perform rendering processing on three-dimensional spatial data in real-time on a basis of the viewpoint information to generate two-dimensional video data corresponding to a field of view of the user; a parameter generation unit configured to generate an encoding parameter on a basis of a parameter regarding the rendering processing; an encoding unit configured to perform encoding processing on the two-dimensional video data in real-time on a basis of the encoding parameter to generate delivering data; and a delivery unit configured to deliver the delivering data to a client.

Moreover, according to the present disclosure, a delivery method is provided. The delivery method includes: acquiring viewpoint information regarding a viewpoint of a user in real-time; performing rendering processing on three-dimensional spatial data in real-time on a basis of the viewpoint information to generate two-dimensional video data corresponding to a field of view of the user; generating an encoding parameter on a basis of a parameter regarding the rendering processing; performing encoding processing on the two-dimensional video data in real-time on a basis of the encoding parameter to generate delivering data; and delivering the delivering data to a client.

BRIEF DESCRIPTION OF DRAWINGS

FIG. 10 is a diagram (first example) depicted to describe an example of data acquired by a parameter generation unit according to the present embodiment.

FIG. 11 is a diagram (second example) depicted to describe an example of data acquired by a parameter generation unit according to the present embodiment.

FIG. 12 is a diagram (third example) depicted to describe an example of data acquired by a parameter generation unit according to the present embodiment.

FIG. 13 is a diagram (first example) depicted to describe an example of data generated by the parameter generation unit according to the present embodiment.

FIG. 14 is a diagram (second example) depicted to describe an example of data generated by the parameter generation unit according to the present embodiment.

FIG. 16 is a hardware configuration diagram depicting an example of the computer 1000 that implements functions of the edge server 400, or the like.

DESCRIPTION OF EMBODIMENTS

Figure 1:
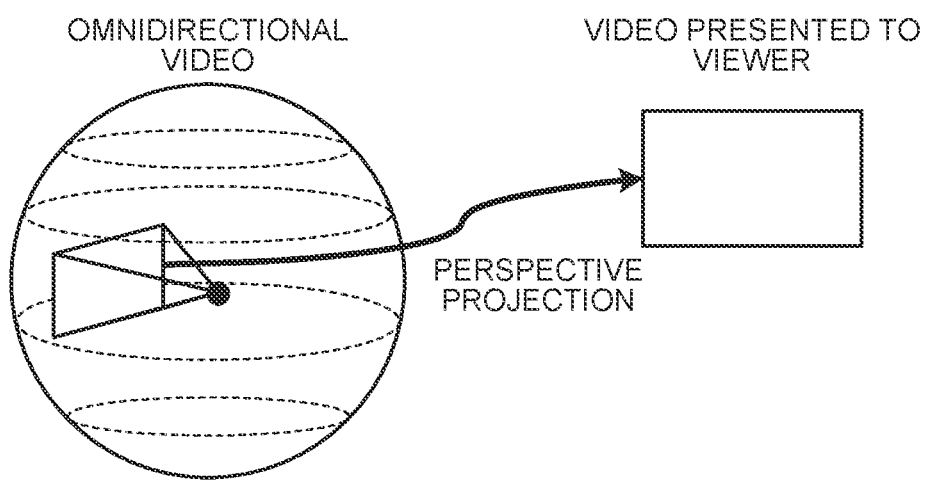
FIG. 1 is a diagram depicted to describe the technical background of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted. In addition, in the present specification and the drawings, a plurality of components having substantially the same or similar functional configuration may be distinguished by attaching different alphabets after the same reference numeral. However, in a case where it is not particularly necessary to distinguish each of a plurality of components having substantially the same or similar functional configuration, only the same reference numeral is attached.

Note that description will be provided in the following order.

1. Technical Background
2. Embodiment
2.1 Configuration of System
2.2 Configuration of Edge Server
2.3 Delivery Processing Method
2.4 Modification
3. Brief Summary
4. Exemplary Hardware Configuration
5. Application Example
6. Supplement

1. Technical Background

Figure 2:
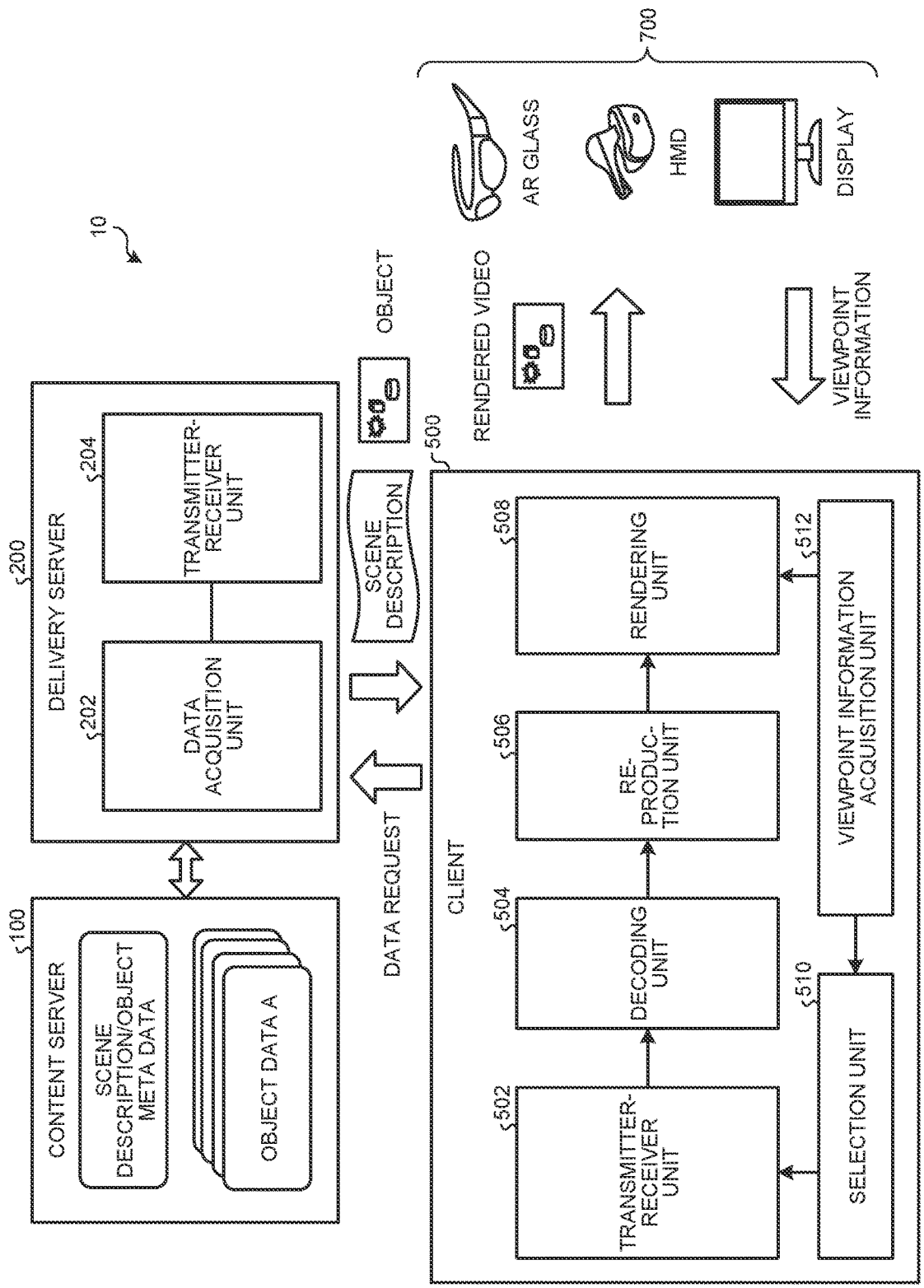
FIG. 2 is a diagram depicted to describe an exemplary configuration of a client-rendering media delivery system.
Figure 3:
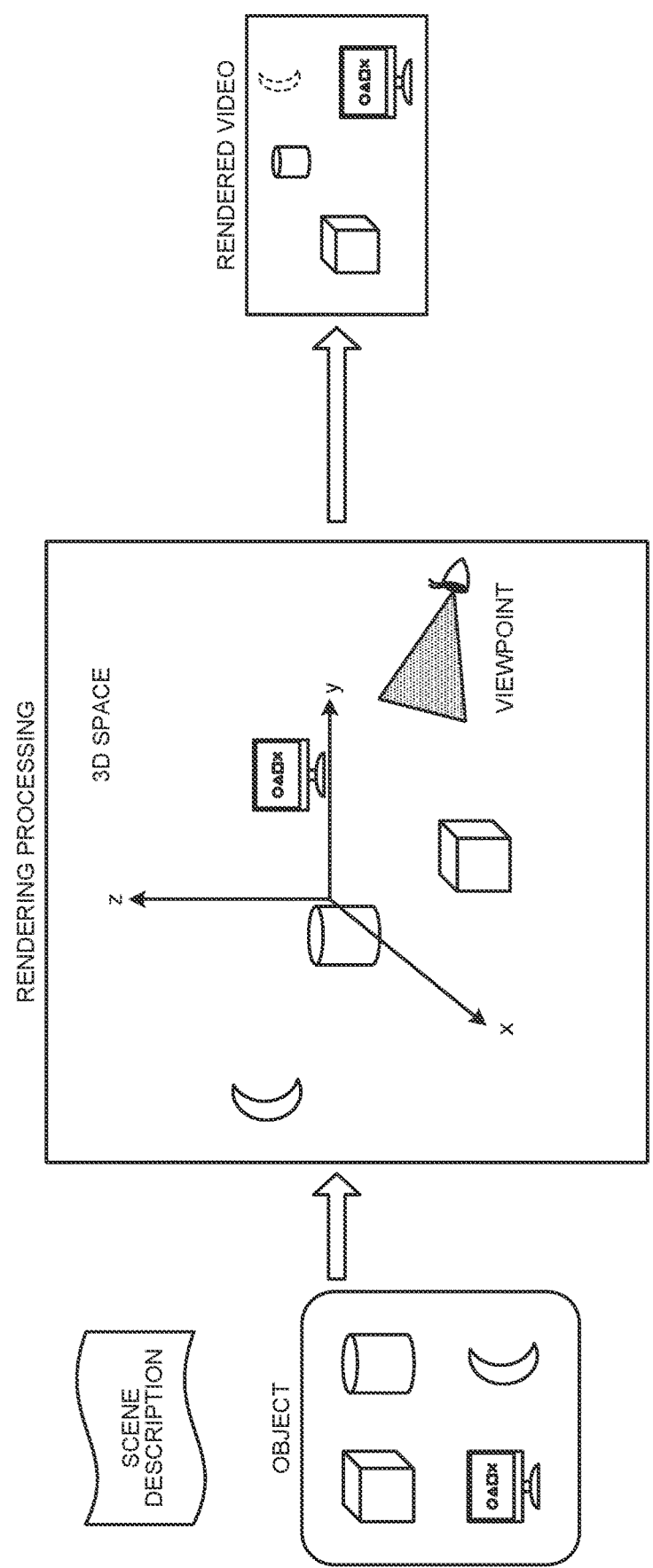
FIG. 3 is a diagram depicted to describe the generation of two-dimensional video, which is actually viewed by a viewer, using rendering processing.
Figure 4:
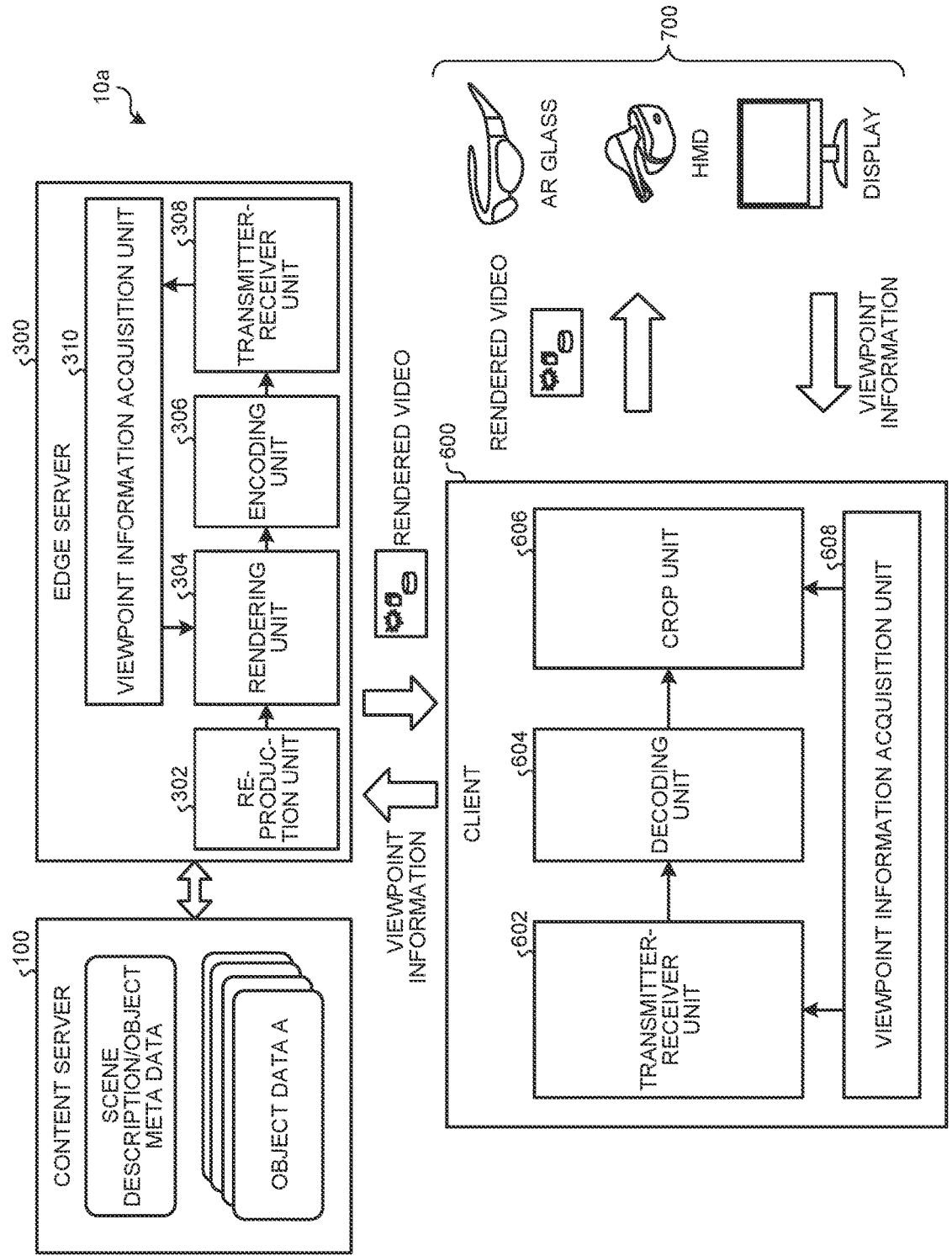
FIG. 4 is a diagram depicted to describe an exemplary configuration of a server-rendering media delivery system.

Referring to FIGS. 1 to 4, the technical background of the present disclosure is now described. FIG. 1 is a diagram depicted to describe the technical background of the present disclosure, and FIG. 2 is a diagram depicted to describe an exemplary configuration of a client-rendering media delivery system. In addition, FIG. 3 is a diagram depicted to describe the generation of two-dimensional video, which is viewed actually by a viewer, using rendering processing. FIG. 4 is a diagram depicted to describe an exemplary configuration of a server-rendering media delivery system.

The video content delivery service is mainly subjected to the delivery of two-dimensional video (also called 2D content) nowadays. Further, in recent years, omnidirectional video, which is captured by an omnidirectional camera or the like and can look around in all directions, has also been subjected to delivery. Such omnidirectional video is also referred to as three degrees of freedom (3DoF) video or 3DoF content. More recently, as described earlier, techniques for delivering six degrees of freedom (6DoF) content allowing a viewer (user) to look in all directions and to shift freely in three-dimensional space, has also been developing. Such 6DoF content is a dynamical reproduction of three-dimensional space with one or a plurality of three-dimensional objects depending on the viewer's viewpoint position, line-of-sight direction, and viewing angle each time. Moreover, information such as the viewer's viewpoint position, line-of-sight direction, and viewing angle is herein referred to as viewpoint information.

The term "three-dimensional object" used herein means the entirety or a part of one or a plurality of objects existing in the three-dimensional space reproduced in the omnidirectional video. The data used to display the three-dimensional object (object data) is constituted by mesh data representable as shape data of a polyhedron and texture data attached to the surface or is constituted by a set of multiple points (point cloud).

Further, the three-dimensional space can be represented in the case where the above-mentioned omnidirectional video can be displayed on a two-dimensional display or head-mounted display (HMD). In this case, a three-dimensional object that is distant from the viewer's viewpoint position is displayed small, and a three-dimensional object that is close to the viewer's viewpoint position is displayed large. Moreover, the three-dimensional object with a small display may have low display resolution. Thus, the 6DoF content also includes data called scene description for displaying the three-dimensional object depending on the distance from the viewpoint position together with the object data mentioned above, for the purpose of appropriately displaying the three-dimensional object depending on the distance from the viewpoint position.

Currently, there are various standards for scene description. A scene is typically represented by a graph having a tree hierarchical structure called a scene graph. The scene graph is represented in a binary format or text format. Herein, the scene graph is spatial display control information based on the viewpoint position and is constituted by defining information regarding the display of the three-dimensional object at the viewpoint position as constituent units of a node and hierarchically combining a plurality of nodes. Examples of the node include a node indicating information regarding the position or size of the three-dimensional object, a node indicating information regarding access to the mesh or texture data, and a node indicating information or the like for appropriate display depending on the distance from the viewpoint position. Such nodes are used for individual three-dimensional objects.

Moreover, the 6DoF content is herein defined to be constituted by the scene description data, which is the metadata, and the object data of a plurality of three-dimensional objects. In addition, the scene description data is defined to follow the rules defined in the MPEG-4 scene description protocol (ISO/IEC 14496-11). Moreover, the MPEG-4 scene description data is a binary version of the scene graph in the format of MPEG-4's Binary Format for Scenes (BIFS). It is possible to convert this scene graph to BIFS using a predetermined algorithm. In addition, storing into the ISO base media file format makes it possible to specify the scene for each time, representing a moving object or the like.

As described above, 6DoF content contains a large amount of data. Furthermore, increasing the resolution of the video presented to a viewer requires increasing the resolution of the three-dimensional content video to be delivered. Thus, the delivery of 6DoF content increases the amount of compressed (encoded) data, leading to an increase in the required data transfer rate, but it is difficult to prevent or reduce such an increase. Thus, as described below, a technique for preventing or reducing an increase in the amount of data to be transmitted has been considered.

Specifically, in the case of delivering the 6DoF content to a viewer, the final video viewed by the viewer is a two-dimensional video stream that is cut out from a part of the entire omnidirectional video depending on the viewer's viewpoint information. In other words, as depicted in FIG. 1, the video actually viewed by the viewer seems to be limited to a part of the 6DoF content.

Thus, the viewer's viewpoint information is sent from a client to a delivery server, and the delivery server clips or cuts out a part of the omnidirectional video using perspective projection on the basis of the viewpoint information, which allows the generation (rendering) of two-dimensional video (rendered video) that is to be viewed by the viewer actually. Furthermore, an interactive server-rendering media delivery system has been considered in which the delivery server delivers the generated rendered video to the client. In such a delivery system, video data to be delivered does not include video data outside the viewer's field of view, so it is possible to prevent or reduce an increase in the amount of data to be delivered, resulting in the highly efficient utilization of the delivery transmission band without waste. Furthermore, the delivery system mentioned above makes it possible for even a client having no rendering function to view/listen to the 6DoF content.

However, unlike the existing virtual reality (VR) video delivery scheme that delivers the same pre-encoded (pre-compressed) omnidirectional video to all viewers, the delivery system mentioned earlier requires encoding the rendered video in "real-time" on the basis of viewpoint information regarding the viewer's viewpoint that varies every moment. In other words, the delivery system mentioned earlier fails to prepare the encoded rendered video in advance. A failure of such real-time encoding to an assignment of processing resources enough for the encoding processing makes it difficult to achieve higher-efficiency compression than the non-real-time encoding processing, thus challenging overcoming deterioration in the quality of an image presented to a viewer.

Thus, as an alternative to the server-rendering media delivery system in which the delivery server performs rendering processing and real-time encoding processing on the basis of the viewpoint information as described above, the client-rendering media delivery system in which the client performs the rendering processing, as depicted in FIG. 2, has been considered.

Specifically, a delivery system 10, as the delivery system mentioned above, includes a content server 100 that stores 6DoF content and a delivery server 200 that delivers the 6DoF content to a client 500, as depicted in FIG. 2. The delivery system 10 further includes the client 500 that plays back the delivered 6DoF content and a display apparatus 700 (e.g., augmented reality (AR) glass, HMD, two-dimensional display, etc.) that displays a video image to the viewer. Moreover, the delivery server 200 and the client 500 are connected to each other via a communication network (not depicted).

More specifically, the delivery server 200 has a data acquisition unit 202 that acquires 6DoF content from the content server 100 and a transmitter-receiver unit 204 that transmits or receives information to or from the client 500. Then, the delivery server 200 acquires the scene description described with the scene configuration and the encoded object data constituting the scene, which are provided from the content server 100 in response to a data request from the client 500, and delivering them to the client 500.

Further, the client 500 has a transmitter-receiver unit 502 that transmits or receives information to or from the delivery server 200, a decoding unit 504 that performs decoding processing, a reproduction unit 506 that reproduces a three-dimensional space, and a rendering unit 508 that performs rendering processing on the basis of the viewpoint information. Furthermore, the client 500 further includes a viewpoint information acquisition unit 512 that acquires the viewer's viewpoint information and a selection unit 510 that selects 6DoF content to be acquired from the content server 100 via the delivery server 200 on the basis of the viewpoint information. The client 500 first acquires the encoded object data, decodes the acquired object data, then arranges each three-dimensional object in the three-dimensional space based on the scene description, so reproducing the three-dimensional space, as depicted in FIG. 3. Furthermore, the client 500 cuts out or clips a video image viewed from the viewer's viewpoint from the reproduced three-dimensional space video (rendering) on the basis of viewpoint information acquired from a wearable device (e.g., AR glass) attached to a part of the viewer's body. Accordingly, the client 500 generates a rendered video that is a two-dimensional video stream to be actually viewed by the viewer. The client 500 then outputs the generated rendered video to the display apparatus 700.

Then, the display apparatus 700 displays the rendered video to the viewer, and its playback is controlled by the client 500. The display apparatus 700 can be an HMD or AR glass worn on the viewer's head. Furthermore, such HMD or the like can be provided with a laser range scanner (not depicted) or a motion sensor (not depicted) to sense the viewer's position and the orientation, inclination, movement, moving velocity, and the like of the body. In addition, such HMD or the like can be provided with an image capturing device (not depicted) that acquires a video image of the viewer's face to sense the viewer's line-of-sight direction and the like. Moreover, examples of the display apparatus 700 can include a two-dimensional display such as a television, smartphone (not depicted), or tablet (not depicted).

However, the delivery system 10 with the configuration depicted in FIG. 2 will deliver even data that does not contribute to the two-dimensional video viewed actually by the viewer (e.g., data that constitutes the back side of a three-dimensional object that is not visible from the viewer's viewpoint, or a portion that is hidden by another three-dimensional object, or data that is outside the viewer's field of view, etc.), making it difficult to prevent or reduce an increase in the amount of data to be delivered, which is similar to the existing VR video delivery. Furthermore, the increase in the number of three-dimensional objects constituting the three-dimensional space leads to an increase in the amount of data to be rendered on the client 500 side, thus resulting in an increase in the processing load of real-time rendering processing. In such a case, any use of a mobile client or the like, as the client 500, with restrictions on the power supply (battery capacity) and processing resources makes it difficult to output the 6DoF content seamlessly.

Thus, to prevent or reduce an increase in the amount of data to be delivered and the processing load on the client 500 as described above, a server-rendering media delivery system 10a that performs the rendering processing on the basis of the viewpoint information on the delivery server side as depicted in FIG. 4 has been considered. In other words, the delivery system 10a concerned causes the rendering processing described with reference to FIG. 3 to be executed by an edge server 300.

Specifically, as depicted in FIG. 4, the delivery system 10a includes a content server 100 that stores 6DoF content, an edge server 300 that performs rendering processing, a client 600 that performs decoding processing, and a display apparatus 700 that displays video to a viewer. Furthermore, the edge server 300 and the client 600 are connected to each other over a communication network (not depicted).

More specifically, the edge server 300 includes a reproduction unit 302 that acquires 6DoF content from the content server 100 to reproduce a three-dimensional space and a rendering unit 304 that performs rendering processing on the basis of the viewpoint information. The edge server 300 also includes an encoding unit 306 that encodes the rendered video generated by the rendering unit 304 and a transmitter-receiver unit 308 that transmits or receives information to or from the client 600. The edge server 300 further includes a viewpoint information acquisition unit 310 that acquires the viewpoint information from the client 600. The edge server 300 first acquires the viewpoint information from the client 600 without delay (in real-time). The edge server 300 then acquires the scene description and the object data from the content server 100 and arranges each three-dimensional object in the three-dimensional space on the basis of the scene description, thus reproducing the three-dimensional space. The edge server 300 then cuts out the video viewed from the viewer's viewpoint from the reproduced three-dimensional space video on the basis of the viewpoint information acquired in real-time (real-time rendering processing), thus generating the rendered video that is two-dimensional video viewed actually by the viewer. In this case, the generated rendered video is basically substantially the same as the video to be presented to the viewer. The edge server 300 then performs encoding processing (compression encoding) on the rendered video in real-time and delivers the encoded video to the client 600 via the transmitter-receiver unit 308.

Further, the client 600 includes a transmitter-receiver unit 602 that transmits or receives information to or from the delivery server 200, a decoding unit 604 that performs decoding processing, a crop unit 606 that trims the rendered video depending on the latest viewpoint information, and a viewpoint information acquisition unit 608 that acquires the viewpoint information of the viewer. The client 600 performs decoding processing on the encoded rendered video that is delivered, performs trimming on the rendered video depending on the latest viewpoint information as necessary (details of the trimming will be described later), and output the result to the display apparatus 700.

The delivery system 10a allows the client 600 to only decode the delivered rendered video to obtain the video stream to be presented to the viewer. In other words, the client 600 does not perform the processing of arranging each three-dimensional object in the three-dimensional space on the basis of the scene description and the rendering processing of cutting out the video viewed from the viewer's viewpoint. Thus, the delivery system 10a makes it possible to prevent or reduce an increase in the amount of data to be delivered, leading to the prevention or reduction of an increase in the processing load on the client 600 side.

However, the server-rendering media delivery system 10a described above gives priority to encoding the rendered video in "real-time" on the basis of the viewpoint information that varies every moment. For this reason, it is difficult for the delivery system 10a to perform encoding processing involving high-load processing, such as a motion vector search, using sufficient processing resources. Thus, in the delivery system 10a, the delivery server (edge server 300) performs real-time encoding, which leads to the limitation of improving the high image quality.

Specifically, the real-time encoding described above requires completing the encoding of one frame within one frame playback time (e.g., upon inter-frame compression, a delay of one to three frames due to reordering occurs at the start of processing, but after that, requiring maintenance of the delay concerned). More specifically, in the case where the frame rate of the moving image is f [Hz], the time required for the encoding of the image for one frame in the real-time encoding is necessary to be 1/f second or less. Thus, this configuration makes it difficult to perform high-load processing such as a full search in which the motion vector search is performed over the entire screen, and even if it is possible, the processing can only be performed on a limited part of the screen. Thus, the real-time encoding described above is challenging to address the degradation of compression efficiency compared with the non-real-time encoding. The degradation of compression efficiency herein means a drop in image quality at the same bit rate or an increase of bit rate at the same image quality compared to the non-real-time encoding that performs encoding over a sufficient time to process offline.

In other words, achieving encoding processing in real-time and with high image quality is difficult for the server-rendering media delivery system 10a.

Thus, in view of such a situation, the present inventor has focused on the fact that the rendering and the real-time encoding processing are performed independently in the server-rendering media delivery system 10a. The present inventor has developed novel technology according to an embodiment of the present disclosure, capable of executing the rendering and the real-time encoding processing in conjunction with each other on the basis of the above focus of attention, thus executing the encoding processing in real-time and with high image quality.

2. Embodiment

An embodiment of the present disclosure developed by the present inventor are now described in detail. Moreover, the present embodiment is assumed to deliver two two-dimensional video data items for the right and left eyes in the case where the display apparatus 700 is a device capable of three-dimensional display (stereo display) using parallax. However, even using the two two-dimensional video data items described above, there are no differences between their generation processing methods. Thus, the description below is given by taking the example of generating and processing one two-dimensional video data item.

Further, in the embodiment of the present disclosure described below, the content being delivered is assumed to be 6DoF content (three-dimensional spatial data) that includes omnidirectional video data, 360-degree spatial video data, and the like. In addition, the 6DoF content includes the scene description (three-dimensional space description data) used to define the configuration of the three-dimensional space and the object data used to define a three-dimensional object in the three-dimensional space, as described above.

<2.1 Configuration of System>

An exemplary configuration of a delivery system according to an embodiment of the present disclosure is now described. The delivery system according to an embodiment of the present disclosure is the server-rendering media delivery system 10a. Thus, the delivery system according to an embodiment of the present disclosure is similar to the delivery system 10a depicted in FIG. 4 described above, so the description thereof will be omitted herein. Note that the above-described configuration described with reference to FIG. 4 is merely an example, and the configuration of the delivery system according to the present embodiment is not limited to this example. That is, the configuration of the delivery system according to the present embodiment can be flexibly transformed in accordance with specifications and operation.

<2.2 Configuration of Edge Server>

Figure 5:
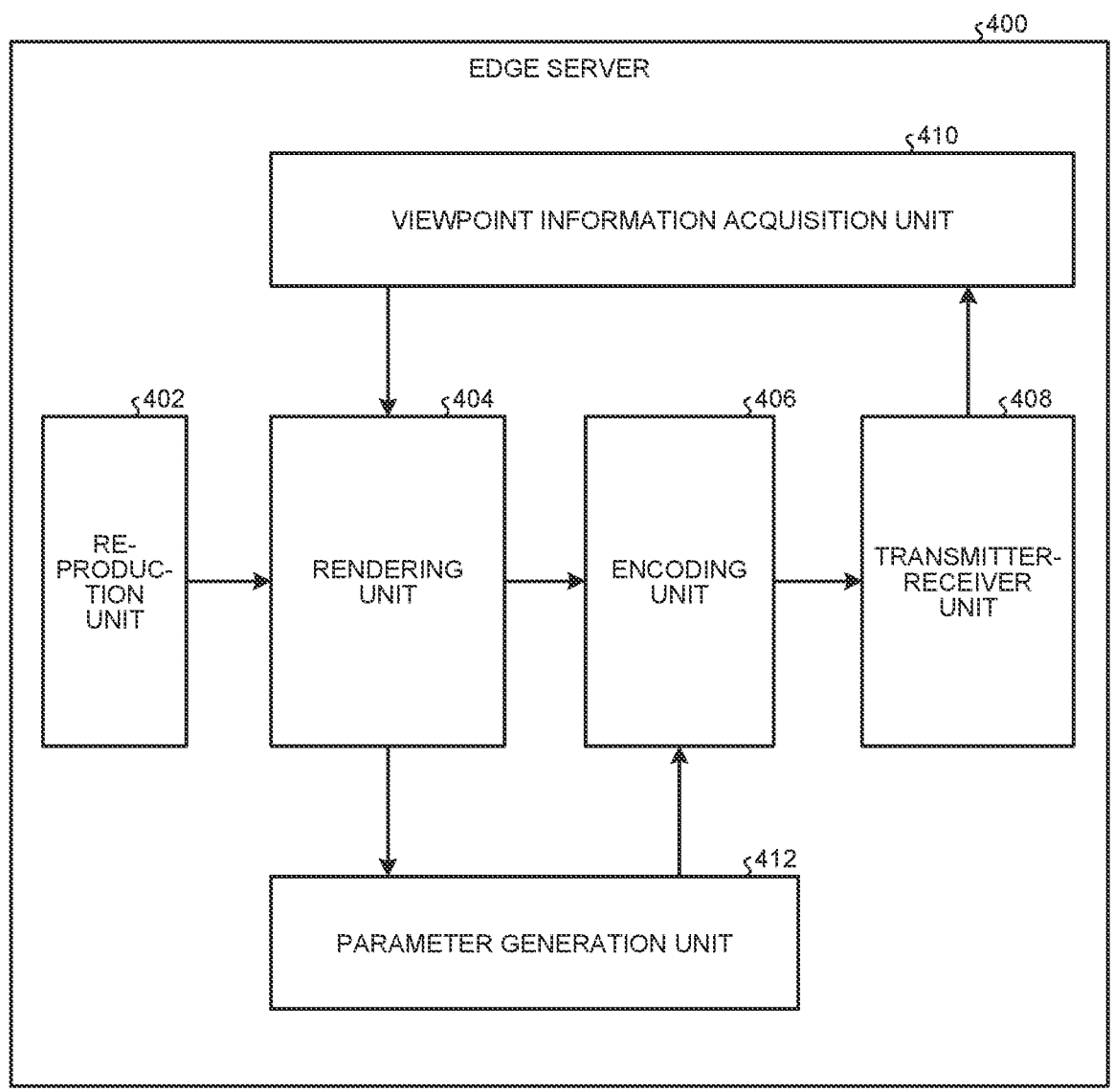
FIG. 5 is a block diagram depicting an exemplary functional configuration of an edge server according to an embodiment of the present disclosure.
Figure 6:
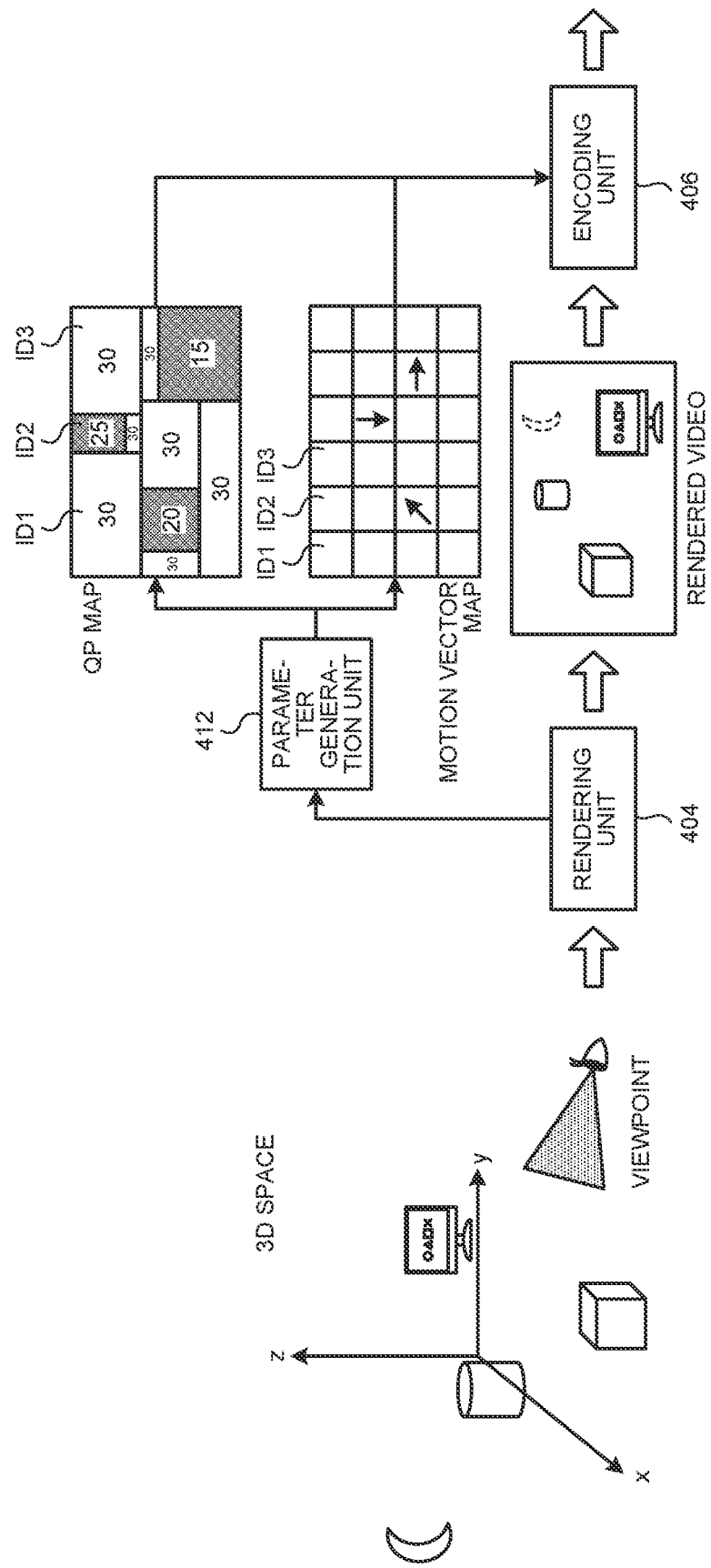
FIG. 6 is a diagram depicted to describe the processing in the edge server according to the present embodiment.
Figure 7:
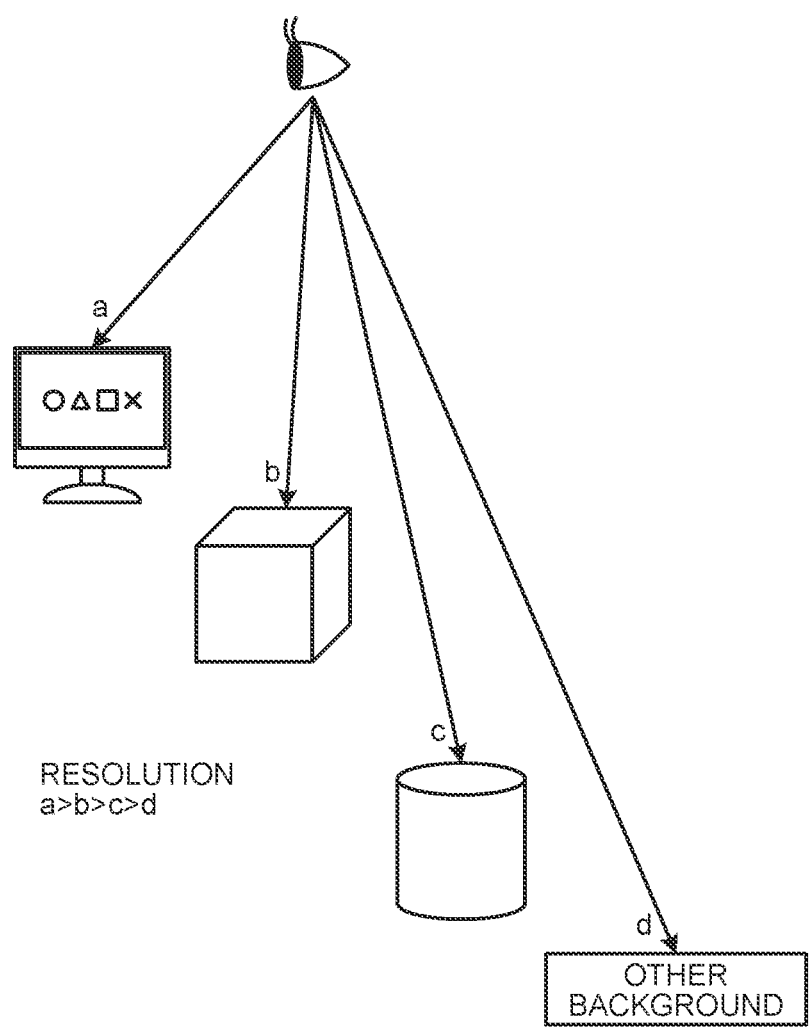
FIG. 7 is a diagram depicted to describe the resolution setting according to the present embodiment.
Figure 8:
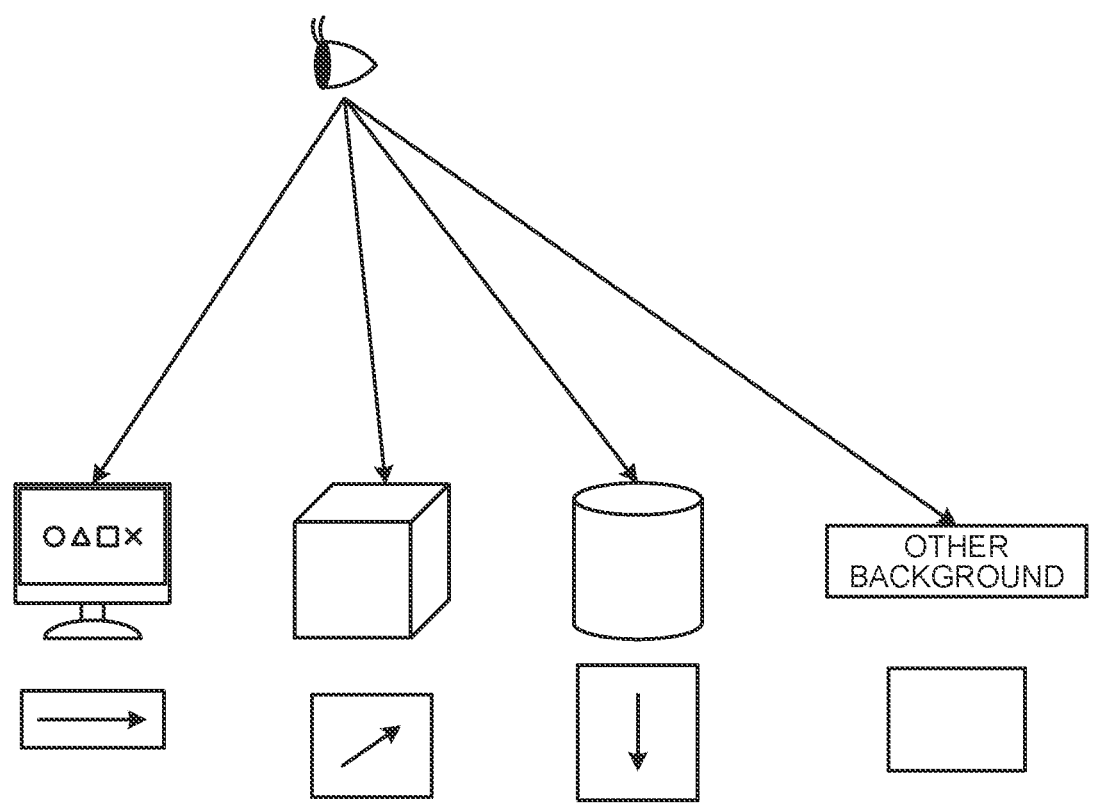
FIG. 8 is a diagram depicted to describe the motion vector setting according to the present embodiment.

Referring to FIGS. 5 to 8, an exemplary configuration of an edge server 400 according to the present embodiment is now described. FIG. 5 is a block diagram depicting an exemplary functional configuration of the edge server according to the present embodiment, and FIG. 6 is a diagram depicted to describe processing in the edge server according to the present embodiment. In addition, FIG. 7 is an explanatory diagram depicted to describe the resolution setting according to the present embodiment, and FIG. 8 is a diagram depicted to describe the motion vector setting according to the present embodiment.

In the present embodiment, the edge server 400 is constituted by, for example, a central processing unit (CPU), a micro processing unit (MPU), a storage unit, which are not depicted, and the like. The CPU, the MPU, and the like use a program or data stored in the storage unit to perform processing according to the present embodiment. Specifically, the edge server 400, as depicted in FIG. 5, includes a reproduction unit 402, a rendering unit 404, an encoding unit 406, a transmitter-receiver unit (delivery unit) 408, a viewpoint information acquisition unit 410, and a parameter generation unit 412 as main components. Each functional unit of the edge server 400 is now described in detail.

(Reproduction Unit 402)

The reproduction unit 402 acquires a scene description (three-dimensional space description data) and object data (three-dimensional object data) as 6DoF content from the content server 100 and arranges each three-dimensional object defined as the object data in the three-dimensional space on the basis of the scene description, thus representing the three-dimensional space. Furthermore, the reproduction unit 402 outputs the reproduced three-dimensional spatial data to the rendering unit 404 described later.

(Rendering Unit 404)

The rendering unit 404 is capable of generating a rendered video (two-dimensional video data) in real-time depending on the viewer's field of view from the reproduced three-dimensional space (a set of high-dimensional data) on the basis of the viewpoint information of the viewer (real-time rendering), as depicted in FIG. 6. The rendering unit 404 then outputs the generated rendered video to the encoding unit 406 and the parameter generation unit 412, which are described later.

Furthermore, the present embodiment allows the rendering unit 404 to output data to be described below to the parameter generation unit 412 described later so that the rendering unit 404 and the encoding unit 406 can cooperate with each other via the parameter generation unit 412.

Specifically, as described above, the three-dimensional space can be represented in such a manner that a three-dimensional object that is distant from the viewer's viewpoint position in the three-dimensional space (three-dimensional virtual space) is displayed as small, and a three-dimensional object that is close to the viewer's viewpoint position is displayed as large. Furthermore, in this representation, as depicted in FIG. 7, a three-dimensional object with a large display makes its display resolution higher, and a three-dimensional object with a small display makes its display resolution lower. In other words, in the present embodiment, the rendering unit 404 determines a display resolution of the three-dimensional object in the rendered video depending on the distance from the viewer's viewpoint in the three-dimensional virtual space to the three-dimensional object and performs the rendering processing in accordance with the determined resolution. In this way, even if the rendered video resolution is caused to have a distribution, the viewer can view the three-dimensional object located nearby clearly as in the real space, so the viewer can view without feeling uncomfortable, which results in satisfactory image quality. In one example, in the case where the rendered video has a uniform resolution throughout, the rendered video has a region with an appropriate resolution and a region with an unnecessarily high resolution for the viewer mixed. The existence of a region with high resolution increases the load due to data being delivered and relevant processing. On the other hand, the present embodiment causing the resolution in the rendered video to have an appropriate distribution makes it possible to prevent or reduce an increase in the load due to delivering data being delivered and relevant processing while maintaining satisfactory video quality for the viewer.

Moreover, in the present embodiment, it is more desirable to determine the display resolution of the three-dimensional object in the rendered video in consideration of information regarding the effective network bandwidth between the server and the client. In one example, in a situation of a low transfer rate, it is necessary to prevent or reduce an increase in the amount of data to be delivered. In such a case, lowering the resolution to generate rendered video with fewer data in advance and then performing low-load compression with an encoder are likely to prevent or reduce the deterioration in the image quality of the encoded video, rather than generating a rendered video with a large amount of data due to the existence of a high-resolution region and high-load compressing it with an encoder. Thus, in the present embodiment, it is desirable to determine the resolution in consideration of information regarding the effective network bandwidth between the server and the client.

Thus, in the present embodiment, the rendering unit 404 performs rendering processing in such a way to cause the resolution in the rendered video to have a distribution and outputs a resolution map showing the resolution distribution in the rendered video to the parameter generation unit 412 described later. Then, the parameter generation unit 412 decides the compression efficiency in the rendered video on the basis of the resolution map. The encoding unit 406 performs the encoding processing on the basis of the decided compression efficiency (details thereof will be described later).

Moreover, it is conceivable to output information regarding the distance between the viewer's viewpoint and each three-dimensional object, instead of the resolution map of the rendered video, to the parameter generation unit 412. Such distance information is called a depth map and can be output from the rendering unit 404. The depth map represents each pixel in the rendered video with the distance information (coordinates) in association with each other. However, the depth map represents not the resolution distribution set by the rendering unit 404 but the distance information. Thus, in the present embodiment, the parameter generation unit 412 directly acquires the resolution map representing the resolution distribution in the rendered video, rather than the depth map, from the rendering unit 404 and decides the compression efficiency in the rendered video on the basis of the resolution map. This allows the present embodiment to reduce the processing load on the parameter generation unit 412.

Further, the rendering unit 404 generates information regarding a region occupied by the display of the three-dimensional object in the rendered video (occupied region-related information) and information regarding the motion of the three-dimensional object (motion-related information) on the basis of the reproduced three-dimensional space and the viewer's viewpoint information. The rendering unit 404 then outputs the generated occupied region-related information and motion-related information to the parameter generation unit 412. These pieces of information are used by the parameter generation unit 412 to generate information for the search in the encoding unit 406.

Furthermore, the rendering unit 404 compares images between consecutive frames in the rendered video and outputs information regarding a variation between them (a comparison result) to the parameter generation unit 412. The comparison result is used in determining whether or not the encoding processing for each frame is performed by the encoding unit 406. Moreover, the details of various types of data output by the rendering unit 404 to the parameter generation unit 412 will be described later.

(Encoding Unit 406)

The encoding unit 406 performs encoding processing (compression encoding) on the rendered video output from the rendering unit 404 in real-time on the basis of various parameters output from the parameter generation unit 412 described later, generating delivering data. Furthermore, the encoding unit 406 delivers the generated delivering data to the client 600 via the transmitter-receiver unit 408 described later.

Specifically, the encoding unit 406 performs real-time encoding processing on each region of the rendered video on the basis of a quantization parameter (QP) map, as depicted in FIG. 6, output from the parameter generation unit 412.

More specifically, the present embodiment allows the encoding unit 406 to be capable of compressing the points of interest or important regions in the rendered video by switching the quantization accuracy (quantization parameter (QP)) in the rendered video for each region, thus preventing or reducing the deterioration of image quality. This makes it possible for the present embodiment to prevent or reduce an increase in the load on the delivering data and relevant processing while maintaining the satisfactory quality of video in a region important to the viewer. Moreover, the QP value herein is a value indicating the quantization step at the time of lossless compression efficiency. The high QP value makes the amount to be encoded small and the compression efficiency high, thus making the deterioration of image quality due to compression larger. On the other hand, the low QP value makes the amount to be encoded large and the compression efficiency low, thus allowing the deterioration of image quality due to compression to be prevented or reduced.

However, there is a traditional technique for preventing or reducing the deterioration of image quality due to compression of points of interest or important regions in the rendered video by switching the QP values for each region. In one example, the image recognition for the rendered video, extraction of the outline of the three-dimensional object in the video concerned, separation of the three-dimensional object, and assignment of a low QP value to the region occupied by the three-dimensional object concerned are performed. These processing operations lower compression efficiency, allowing the deterioration of image quality to be prevented or reduced. The efficiency is lowered to prevent or reduce the deterioration of image quality. However, such image recognition takes a large amount of processing time, which does not mean that the three-dimensional object is recognizable accurately. Thus, it is also conceivable that a person decides the rendered video in advance to decide the points of interest or the important regions and performs the screen splitting and determination of QP values. However, the two methods described above are challenging to perform the encoding processing in real-time.

Thus, in the present embodiment, the encoding unit 406 acquires the QP map representing the distribution of the QP values in the rendered video from the parameter generation unit 412 on the basis of the resolution map output from the rendering unit 404. Specifically, the present embodiment creates the QP map by making the QP value small in the high-resolution region and the QP value large in the low-resolution region on the basis of the resolution map representing the resolution distribution in the rendered video. Then, in the present embodiment, the encoding unit 406 subjects the rendered video to encoding processing using the created QP map. Specifically, in the present embodiment, making the QP value small in the high-resolution region causes the amount to be encoded to be larger. Thus, lowering the compression efficiency allows the deterioration of image quality due to compression to be prevented or reduced. On the other hand, making the QP value large in the low-resolution region causes the amount to be encoded to be small, resulting in high compression efficiency. Such configuration makes it possible for the present embodiment to prevent or reduce an increase in the load on the delivering data and relevant processing while maintaining satisfactory video quality for the viewer and, in addition, enabling real-time encoding processing. Moreover, such resolution-based assignment of compression efficiency is also executable by analyzing the rendered video in the encoding unit 406. However, in the present embodiment, the ability to use the resolution map output from the rendering unit 404 eliminates the need for the analysis in the encoding unit 406, reducing the processing load on the encoding unit 406, which enables real-time encoding processing.

By the way, in typical encoding processing (compression encoding), the compression is performed by searching the difference between consecutive frames included in the rendered video and extracting the difference-related information obtained by the search to improve the compression efficiency of a moving image. In this event, further reduction in the amount of difference-related information data is achieved by extracting the region of a subject of shooting (three-dimensional object) to calculate the amount of the subject's motion (relative position information or relative velocity information) between consecutive frames. Furthermore, a prediction image is generated by shifting the subject of the image in the previous frame by the calculated amount of motion (motion compensation interframe prediction). Then, the difference between the image of the previous frame and the prediction image is compressed. This configuration makes it possible to reduce the amount of data and the processing load compared to the case where all the frames are compressed.

However, as described earlier, the real-time encoding processing fails to use sufficient processing resources (processing time) to perform the encoding processing, so a part of the processing is often omitted. An example of processing with a high load includes the motion compensation interframe prediction described above. In one example, if the above-mentioned search is performed over a plurality of consecutive frames with a wide range and high accuracy, the time required for encoding the video for one frame in the real-time encoding will be exceeded. Thus, in real-time encoding, restricting the search scope is required to prevent or reduce an increase in the processing time without lowering the compression efficiency.

Thus, in the present embodiment, the rendering unit 404 outputs the information regarding the occupied region of the display of the three-dimensional object (occupied region-related information) and the information regarding the motion of the three-dimensional object (motion-related information) in the rendered video to the parameter generation unit 412 described later. The parameter generation unit 412 then calculates the motion vector of each three-dimensional object included in the moving image as depicted in FIG. 8 on the basis of the occupied region-related information and the motion-related information. The parameter generation unit 412 then creates and outputs a motion vector map as depicted in FIG. 6 to the encoding unit 406. The encoding unit 406 then restricts the scope of the search on the basis of the motion vector map and executes the search. This configuration makes it possible for the present embodiment to reduce unnecessary search processing, which leads to efficient encoding processing, thus preventing or reducing an increase in processing time without lowering the compression efficiency.

In addition, in the present embodiment, the encoding unit 406 decides whether or not to encode the following frame between the consecutive frames on the basis of the information regarding a variation between the consecutive frames in the rendered video (comparison result) from the rendering unit 404. The present embodiment with this configuration makes it possible for the encoding unit 406 to use the comparison result, and if there is no variation between consecutive frames, the encoding processing does not need to be executed, thus preventing or reducing an increase in processing time.

In other words, the present embodiment allows the encoding unit 406 to restrict the search scope and the encoding processing using the optimum QP map, thus preventing or reducing an increase in the load on the delivering data and relevant processing to enable the real-time processing while maintaining satisfactory video quality for the viewer. In other words, the present embodiment makes it possible to optimize the efficiency of the encoding processing, improving the video quality at the same processing time and the video quality at the same bit rate.

(Transmitter-Receiver Unit 408)

The transmitter-receiver unit 408 is capable of performing various communications with the client 600. In one example, the transmitter-receiver unit 408 delivers the delivering data generated by the encoding unit 406 to the client 600. In addition, the transmitter-receiver unit 408 receives the viewer's viewpoint information from the client 600 and outputs the viewpoint information to the viewpoint information acquisition unit 410 described later.

(Viewpoint Information Acquisition Unit 410)

The viewpoint information acquisition unit 410 acquires viewpoint information regarding the viewer's viewpoint in real-time via the transmitter-receiver unit 408 and outputs the viewpoint information to the rendering unit 404.

(Parameter Generation Unit 412)

The parameter generation unit 412 generates a parameter used for the encoding processing (encoding parameter) on the basis of the rendering-related parameter from the rendering unit 404 and outputs the encoding parameter to the encoding unit 406.

Specifically, the parameter generation unit 412 acquires the resolution map representing the resolution distribution in the rendered video from the rendering unit 404. The parameter generation unit 412 then splits the rendered video into a plurality of regions (first region) along the boundary of each encoding processing unit region and assigns the QP value to each region on the basis of the resolution map, creating and outputting the QP map depicted in FIG. 6 to the encoding unit 406. The encoding unit 406 performs encoding processing on each region of the rendered video on the basis of the QP value assigned to each region. In this event, the parameter generation unit 412 lowers the QP value as the resolution increases. In addition, in the present embodiment, each region to which the QP value is assigned is not necessarily limited to having exactly the same boundary as each encoding processing unit region used in performing the encoding processing. A plurality of encoding processing unit regions that are assigned with the same QP value and are adjacent to each other can be grouped into one region. Then, in the present embodiment, as depicted in FIG. 6, it is preferable that identification information (ID) is assigned to each region to which the QP value is assigned.

Further, the parameter generation unit 412 acquires the occupied region-related information and the motion-related information of each three-dimensional object from the rendering unit 404. The parameter generation unit 412 then splits the rendered video into a plurality of regions (second region) to correspond to each three-dimensional object. The parameter generation unit 412 assigns the motion vector to each three-dimensional object on the basis of the occupied region-related information and motion-related information of each three-dimensional object, generating and outputting a motion vector map depicted in FIG. 6 to the encoding unit 406. In addition, in the present embodiment, each region to which the motion vector is assigned is not necessarily limited to having exactly the same boundary as each encoding processing unit region used in performing the encoding processing. A plurality of encoding processing unit regions that are assigned with the same motion vector and are adjacent to each other can be grouped into one region. Then, in the present embodiment, as depicted in FIG. 6, it is preferable that identification information (ID) is assigned to each region to which the motion vector is assigned.

Furthermore, the parameter generation unit 412 acquires the comparison result regarding the image variation between consecutive frames in the rendered video from the rendering unit 404 and outputs the comparison result to the encoding unit 406. As described above, according to the present embodiment, it is possible for the encoding unit 406 to use the comparison result, and if there is no variation between consecutive frames, the encoding processing does not need to be executed, thus preventing or reducing an increase in processing time.

Moreover, the configuration above described with reference to FIG. 5 is merely an example, and the configuration of the edge server 400 according to the present embodiment is not limited to such an example. In other words, the configuration of the edge server 400 according to the present embodiment can be flexibly modified depending on the specifications and operations.

<2.3 Delivery Processing Method>

Figure 9:
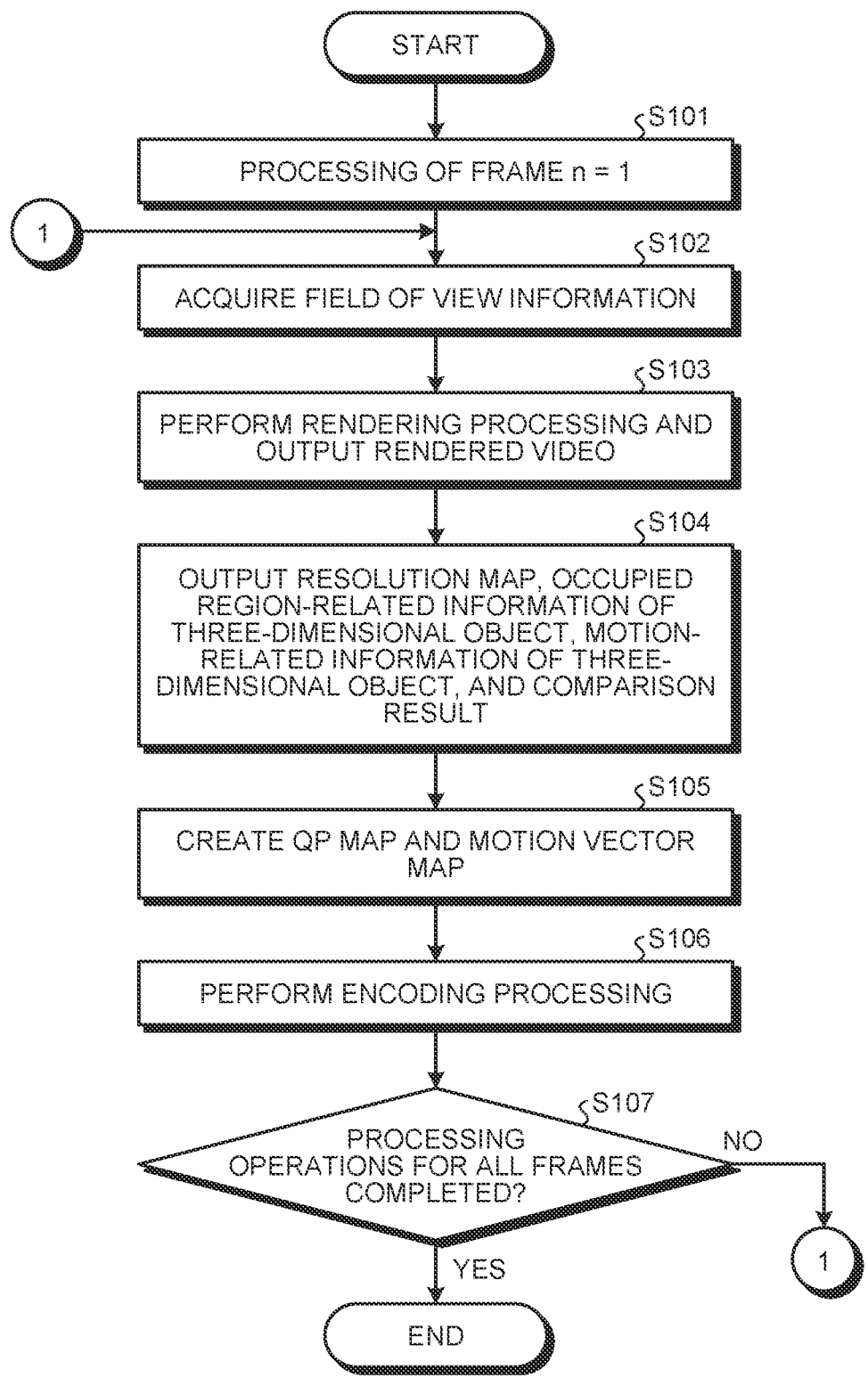
FIG. 9 is a flowchart depicting a delivery processing method according to the present embodiment.

The description above is given of the detailed configuration of the edge server 400 according to the present embodiment. A delivery processing method according to the present embodiment is now described with reference to FIGS. 9 to 14. FIG. 9 is a flowchart depicting the delivery processing method according to the present embodiment. In addition, FIGS. 10 to 12 are diagrams depicted to describe an example of data acquired by a parameter generation unit according to the present embodiment. Further, FIGS. 13 and 14 are diagrams depicted to describe an example of data generated by the parameter generation unit according to the present embodiment.

As depicted in FIG. 9, the delivery processing method according to the present embodiment includes steps S101 to S107. Each step of the delivery processing method according to the present embodiment is now described.

In starting the processing of the first frame included in one piece of 6DoF content, the edge server 400 first sets the number n of the frame to be processed to one (step S101). The edge server 400 then acquires the latest viewpoint information of the viewer from the client 600 (step S102). The edge server 400 then reproduces the three-dimensional space, performs rendering processing on the basis of the viewpoint information acquired in step S102 described above, and outputs the rendered video (step S103).

The edge server 400 outputs the resolution map, the occupied region-related information of the three-dimensional object, motion-related information of the three-dimensional object, and the information regarding image variation between consecutive frames in the rendered video (comparison result), which are obtained during the processing in step S103 described above (step S104).

Specifically, the resolution map is output as a list represented by, for example, the coordinates of a closed region associated with the identification information (ID) of each region and the resolution (horizontal resolution and vertical resolution), as depicted in FIG. 10.

Further, the occupied region-related information and the motion-related information of the three-dimensional object are output as a list depicted in FIG. 11. Specifically, the list of FIG. 11 shows the coordinates that specify the region in the rendered video associated with the identification information (ID) of each three-dimensional object and occupied by each three-dimensional object and the coordinates of the center position of each three-dimensional object (the origin in the local coordinate system of each three-dimensional object). Furthermore, the list of FIG. 11 shows the motion vector of the center of each three-dimensional object. The rendering unit 404 is capable of performing the rendering processing on the basis of the viewer's viewpoint information, the position information of each three-dimensional object in the three-dimensional space, or the like, thus outputting these information items with high accuracy.

Moreover, an example of the information obtained by the rendering processing in the rendering unit 404 includes occlusion-related information indicating the overlap of the three-dimensional objects and their positional relationship before and after. The occlusion-related information indicates the front-back positional relationship between a plurality of three-dimensional objects in the three-dimensional space when viewed from a particular viewpoint position or an invisible region hidden behind other three-dimensional objects. However, the information in the region invisible to the viewer is not included in the rendered video in normal conditions, so it is conceivable that the effectiveness of the encoding unit 406 to perform the encoding processing is low. Thus, in the present embodiment, the rendering unit 404 does not output the occlusion information.

Furthermore, the information regarding the image variation between consecutive frames (comparison result) in the rendered video can be output as, for example, a list depicted in FIG. 12. Specifically, the list of FIG. 12 shows a flag indicating whether or not the frame included in the rendered video is the same as the image of the previous frame. In one example, in the case where the viewer's viewpoint does not shift, and the three-dimensional object is also stationary, the image of the frame becomes the same as the previous frame. Thus, for example, in the case where there is no viewpoint movement and all the three-dimensional objects are stationary, the rendering unit 404 sets the flag to zero. If there is a viewpoint movement, or not all the three-dimensional objects are stationary, the rendering unit 404 sets the flag to one. Then, using the flag makes it possible for the parameter generation unit 412 to recognize immediately whether or not images of two frames are the same without performing the image comparison in the consecutive frames. Then, in the present embodiment, the encoding unit 406 outputs the delivering data identical to the previous frame when the frame is the same as the previous frame using the flag information output from the parameter generation unit 412. In this case, the encoding processing is not performed on the frame, thus reducing the processing load. Furthermore, in the present embodiment, the encoding unit 406 can deliver only the flag information instead of delivering the same delivering data as the previous frame, thus reducing the amount of delivering data.

Furthermore, the edge server 400 creates a QP map and a motion vector map on the basis of the data and rendered video acquired in step S105 described above (step S105). Specifically, the edge server 400 creates the QP map depicted in FIG. 13 and the motion vector map depicted in FIG. 14 on the basis of the list depicted in FIGS. 10 to 12.

Specifically, the edge server 400 splits the rendered video into a plurality of regions (first region) as non-overlapping rectangular regions along the boundary of each encoding processing unit region and assigns the QP value to each region on the basis of the resolution map, creating the QP map. Thus, the list depicted in FIG. 13 shows the coordinates of two points that specify each rectangular region associated with the identification information (ID) of each split region and the assigned QP value of the region concerned. The rectangular region is preferably decided to match the boundary of one or more encoding processing unit regions such as macroblocks, coding units (CUs), slices, or the like, which are processing units during encoding processing. This configuration makes it possible for the present embodiment to split the rendered video into a plurality of rectangular regions, allowing the encoding unit 406 to perform encoding processing with different QP values for each region.

Further, the edge server 400 splits the rendered video into a plurality of regions as rectangular regions that do not overlap (second region) to correspond to each three-dimensional object on the basis of the occupied region-related information and motion-related information of each three-dimensional object and assigns the motion vector of the three-dimensional object to each region, creating the motion vector map. Thus, the list depicted in FIG. 14 shows the coordinates of two points that specify each rectangular region associated with the identification information (ID) of each split region and the assigned motion vector of the region concerned. The rectangular region is preferably determined to match the boundary of the encoding processing unit region having one or a plurality of macroblocks, CUs, slices, or the like, which are processing units during the encoding processing. In this way, in the present embodiment, the encoding unit 406 is capable of performing the execution by restricting the search scope in the motion compensation interframe prediction on the basis of the motion vector. This configuration makes it possible for the present embodiment to reduce unnecessary search processing, which leads to efficient encoding processing, thus preventing or reducing an increase in processing time without lowering the compression efficiency. Moreover, in the list depicted in FIG. 14, it is preferable that the same identification information is assigned to the same three-dimensional object even if the list is in different frames. In the present embodiment, it is possible to recognize how each three-dimensional object shifts over multiple frames by referring to the occupied region-related information of each three-dimensional object in each consecutive frame. Thus, it is possible to assign the same identification information to the same three-dimensional object even if the list is in different frames.

Further, it is possible to recognize a rough movement of each three-dimensional object from the center position of the three-dimensional object and its motion vector. However, in some cases, a part of the three-dimensional object shifts or is deformed in a direction different from its center. Even in such a case, the present embodiment eliminates the need to search the entire screen of the rendered video to acquire the motion vector of the three-dimensional object and makes it possible to perform searching in a restricted scope on the basis of the region occupied by each three-dimensional object in the rendered video. Thus, the present embodiment makes it possible to reduce the processing load related to the search described above. In addition, if the three-dimensional object is flame, particles, or the like, it is displayed semi-transparently and overlaps with another three-dimensional object, so in the rendered video including such an object, it is difficult to use image recognition to recognize and separate the three-dimensional object concerned. However, the present embodiment makes it possible to easily recognize and separate each three-dimensional object on the basis of the region occupied by each three-dimensional object in the rendered video and its position information, obtaining the motion vector with high accuracy.

Moreover, in FIGS. 13 and 14, approximately one region and one motion vector are assigned to one three-dimensional object, but the present embodiment is not limited to this exemplary arrangement. In one example, if the motion is different for each part in one three-dimensional object, the region occupied by one three-dimensional object can be further split, and each split region can be assigned with a motion vector. In other words, in the present embodiment, each region in the QP map and each region in the motion vector map do not necessarily have to match.

The edge server 400 then performs encoding processing on the frame concerned on the basis of the QP map and motion vector map created in step S105 described above and the comparison result output in step S104 (step S106).

The edge server 400 determines whether or not the processing is completed for all the frames included in the 6DoF content (step S107). If the processing is completed for all the frames (step S107: Yes), the edge server 400 ends the delivery processing according to the present embodiment. On the other hand, if the processing is not completed for all the frames (step S107: No), the edge server 400 increments the number n of the processing frames by one and returns to the above-mentioned step S102. In other words, in the present embodiment, the processing operations from step S102 to step S107 are repeatedly performed until the processing for all the frames included in the 6DoF content is completed.

As described above, the present embodiment makes it possible to execute the rendering processing of the rendering unit 404 and the real-time encoding processing of the encoding unit 406 are performed in cooperation with each other via the parameter generation unit 412, thus executing the encoding processing in real-time and with high image quality.

<2.4 Modification>

Figure 15:
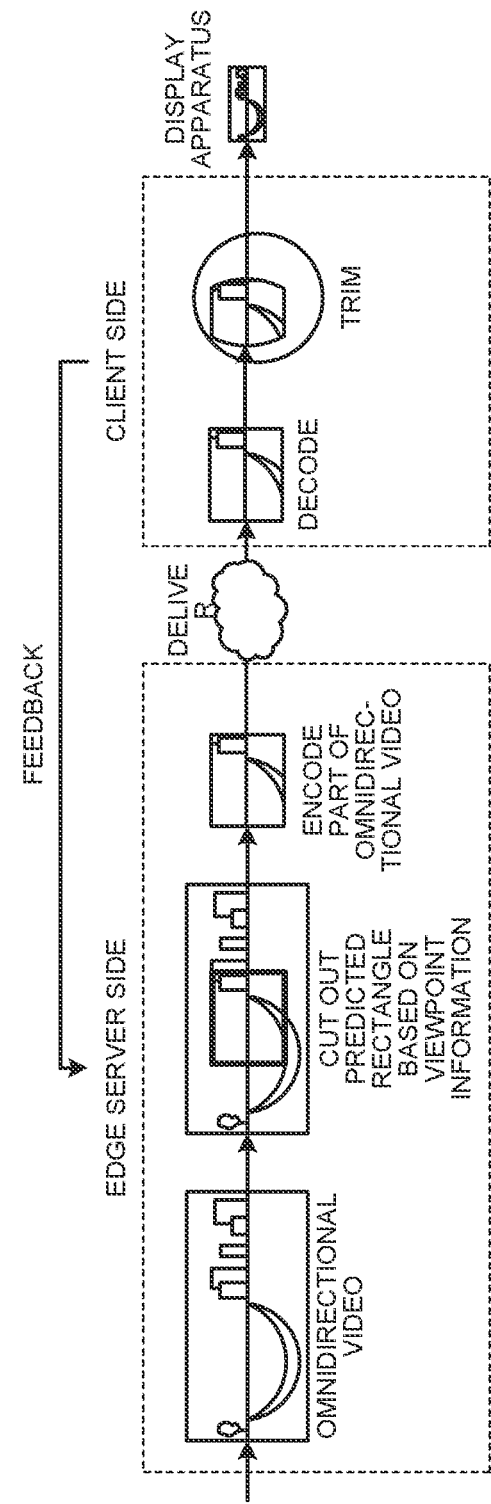
FIG. 15 is a diagram depicted to describe a modification of the present embodiment.

Referring to FIG. 15, a modification of the present embodiment is now described in detail. FIG. 15 is a diagram depicted to describe a modification of the present embodiment.

In the present embodiment described above, the edge server 400 performs the rendering processing on the basis of the viewpoint information of the viewer. However, in the case where the viewer quickly shifts the viewpoint, there may be a deviation (occurrence of response delay) between the viewpoint position and line-of-sight direction used in the rendering processing and the latest viewpoint position and line-of-sight direction.

Thus, in the present modification, such a response delay is eliminated by the edge server 400 acquiring information such as the moving direction and acceleration of the viewpoint (auxiliary information) in addition to the viewpoint information of the viewer. Then, as depicted in FIG. 15, the rendering unit 404 of the edge server 400 performs the rendering processing to cut out, from the reproduced three-dimensional space, a predicted rectangular range that is expanded from the range expected from the viewpoint information to the range expected by the auxiliary information, in consideration of the response delay, on the basis of the viewpoint information and the auxiliary information. Furthermore, the encoding unit 406 of the edge server 400 encodes the range cut out in this way and delivers it to the client 600. In this event, metadata indicating where the rendered video being delivered is set in the three-dimensional space is also delivered.

Then, as depicted in FIG. 15, the decoding unit 604 of the client 600 performs decoding processing on the delivering data. Further, the crop unit 606 maps the predicted rectangular range subjected to the decoding processing and trims (crops) the range to be displayed to fine-tune the range depending on the latest viewpoint information of the viewer. Then, the crop unit 606 outputs the trimmed video to the display apparatus 700.

In other words, in the present modification, the edge server 400 cuts out the predicted rectangular range expanded from the reproduced three-dimensional space to the range predicted by the auxiliary information in consideration of the response delay. The client 600 fine-tunes the range to be displayed depending on the latest viewpoint information of the viewer. This configuration makes it possible for the present modification to match the image to be displayed to the latest viewpoint information of the viewer, so preventing or reducing the occurrence of response delay felt by the viewer without increasing the processing load.

Furthermore, the client 600 preferably feeds back, to the edge server 400, information indicating whether or not trimming is performed appropriately, i.e., whether the predicted rectangular range delivered from the edge server 400 includes a range corresponding to the latest viewpoint information of the viewer, or how much difference there is in the predicted rectangular range from the range corresponding to the latest viewpoint information of the viewer. This configuration makes it possible for the edge server 400 to further improve the prediction accuracy and cut out a suitable prediction rectangular range with high accuracy on the basis of the information provided as feedback.

3. Brief Summary

As described above, in the embodiment of the present disclosure, it is possible to encode the delivered video data in real-time and with high image quality. Moreover, the embodiment of the present disclosure is not limited to the applications to the provision of entertainment services accompanied by video delivery but is also applicable to education, medical support, and the like.

4. Hardware Configuration Example

Figure 16:
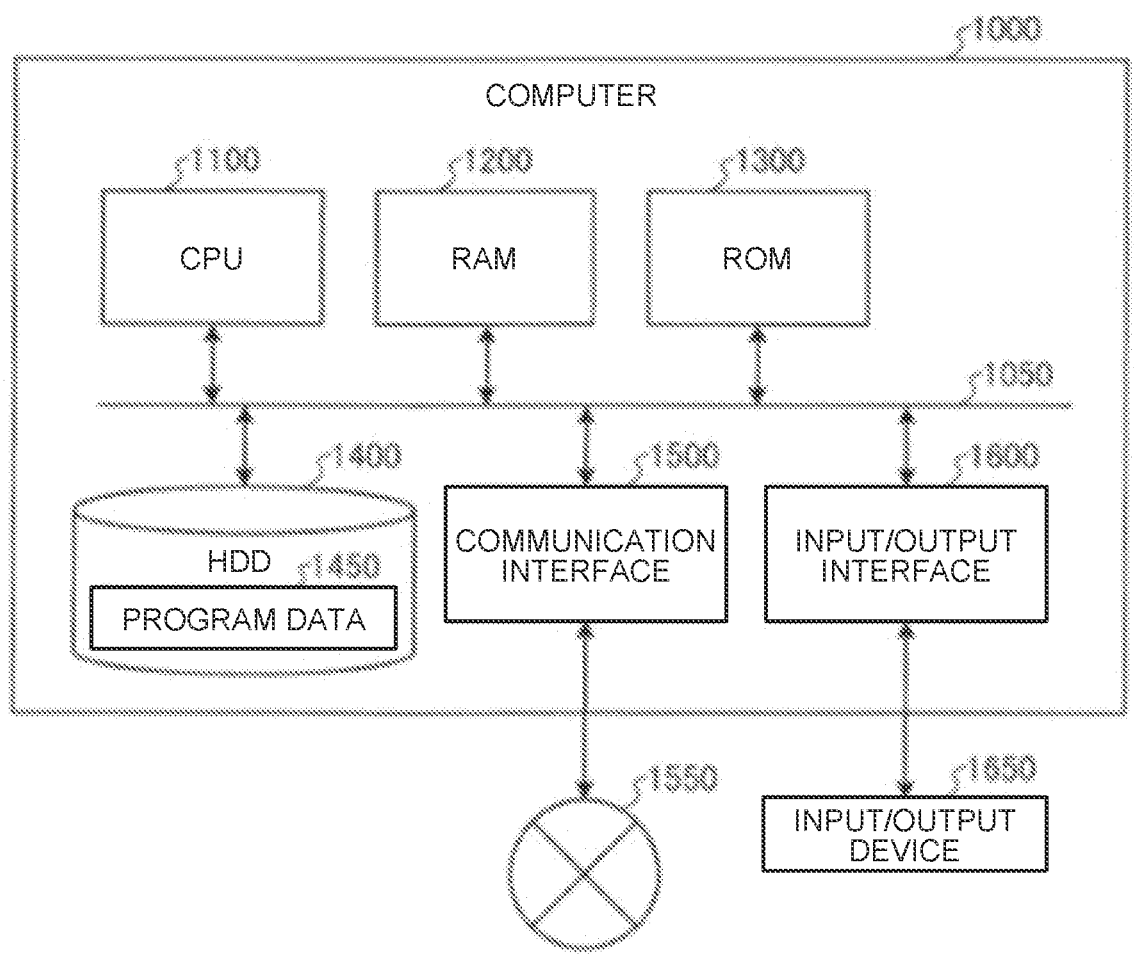

The information processing apparatus such as the edge server 400 according to the present embodiment described above or the like is implemented by a computer 1000 having a configuration as depicted in FIG. 16, for example. Hereinafter, the edge server 400 according to the embodiment of the present disclosure will be described as an example. FIG. 16 is a hardware configuration diagram depicting an example of the computer 1000 that implements functions of the edge server 400, or the like. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure as an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input/output device 1650 such as a keyboard, a mouse, and a microphone via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD), a phase change rewritable disk (PD), a magneto-optical recording medium such as a magneto-optical disk (MO), a tape medium, a magnetic recording medium, a semiconductor memory, or the like.

For example, in a case where the computer 1000 functions as the edge server 400 according to the embodiment of the present disclosure, the CPU 1100 of the computer 1000 implements each function by executing the program stored in the RAM 1200. In addition, the HDD 1400 stores a processing program and the like according to the present disclosure. Note that the CPU 1100 reads the program data 1450 from the HDD 1400 and executes the program data, but as another example, these programs may be acquired from another device via the external network 1550.

Furthermore, the information processing apparatus according to the present embodiment may be applied to a system including a plurality of devices on the premise of connection to a network (or communication between devices), such as cloud computing. That is, the information processing apparatus according to the present embodiment described above can be implemented as the information processing system according to the present embodiment by a plurality of apparatuses, for example.

An example of the hardware configuration of the edge server 400 and the like has been described above. Each of the above-described components may be configured using a general-purpose member, or may be configured by hardware specialized for the function of each component. Such a configuration can be appropriately changed according to the technical level at the time of implementation.

5. Application Example

The technology according to the present disclosure is applicable to various products. In one example, the technology according to the present disclosure is applicable to an endoscopic surgery system.

Figure 17:
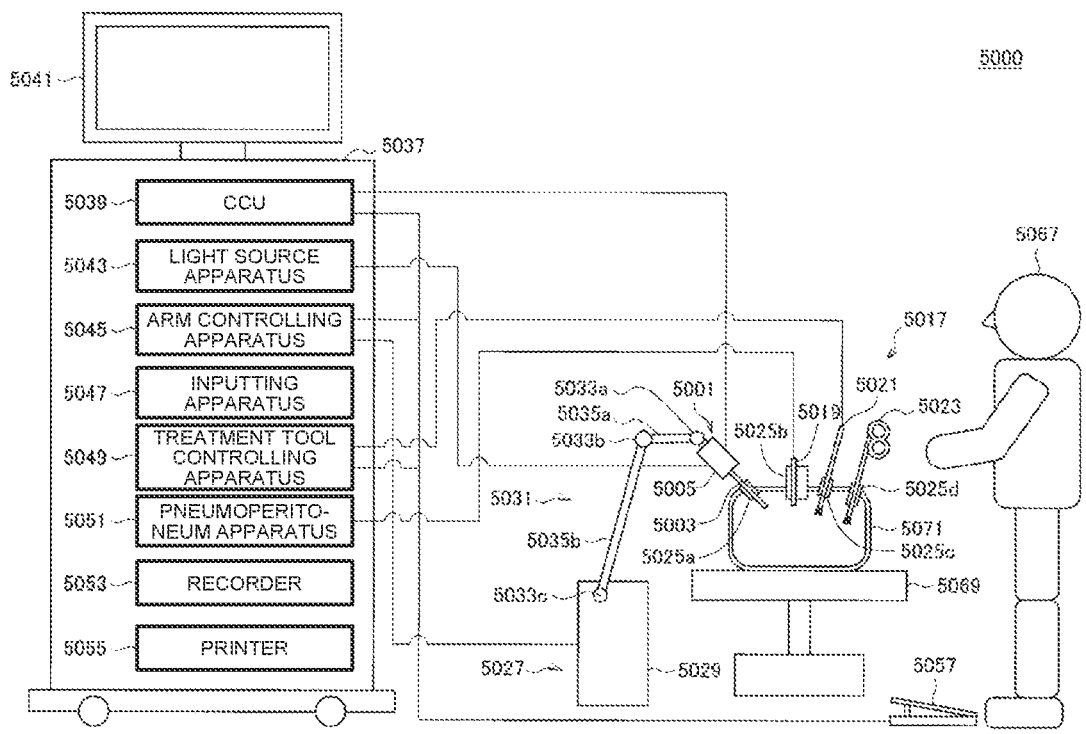
FIG. 17 is a view depicting an example of a schematic configuration of an endoscopic surgery system.

FIG. 17 is a view depicting an example of a schematic configuration of an endoscopic surgery system 5000 to which the technology according to an embodiment of the present disclosure can be applied. In FIG. 17, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body lumens of the patient 5071 through the trocars 5025a to 5025d. In the example depicted, as the other surgical tools 5017, a pneumoperitoneum tube 5019, an energy treatment tool 5021 and forceps 5023 are inserted into body lumens of the patient 5071. Further, the energy treatment tool 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, a pair of tweezers or a retractor may be used.

An image of a surgical region in a body lumen of the patient 5071 imaged by the endoscope 5001 is displayed on a display apparatus 5041. The surgeon 5067 would use the energy treatment tool 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy treatment tool 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body lumen of the patient 5071, and a camera head 5005 connected to a proximal end of the lens barrel 5003. In the example depicted, the endoscope 5001 is depicted which includes as a hard mirror having the lens barrel 5003 of the hard type. However, the endoscope 5001 may otherwise be configured as a soft mirror having the lens barrel 5003 of the soft type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body lumen of the patient 5071 through the objective lens. It is to be noted that the endoscope 5001 may be a direct view mirror or may be a perspective view mirror or a side view mirror.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy treatment tool 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy treatment tool 5021 for cautery or incision of a tissue, sealing of a blood vessel or the like. A pneumoperitoneum apparatus 5051 feeds gas into a body lumen of the patient 5071 through the pneumoperitoneum tube 5019 to inflate the body lumen in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 17, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body lumen of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the surgery room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Figure 18:
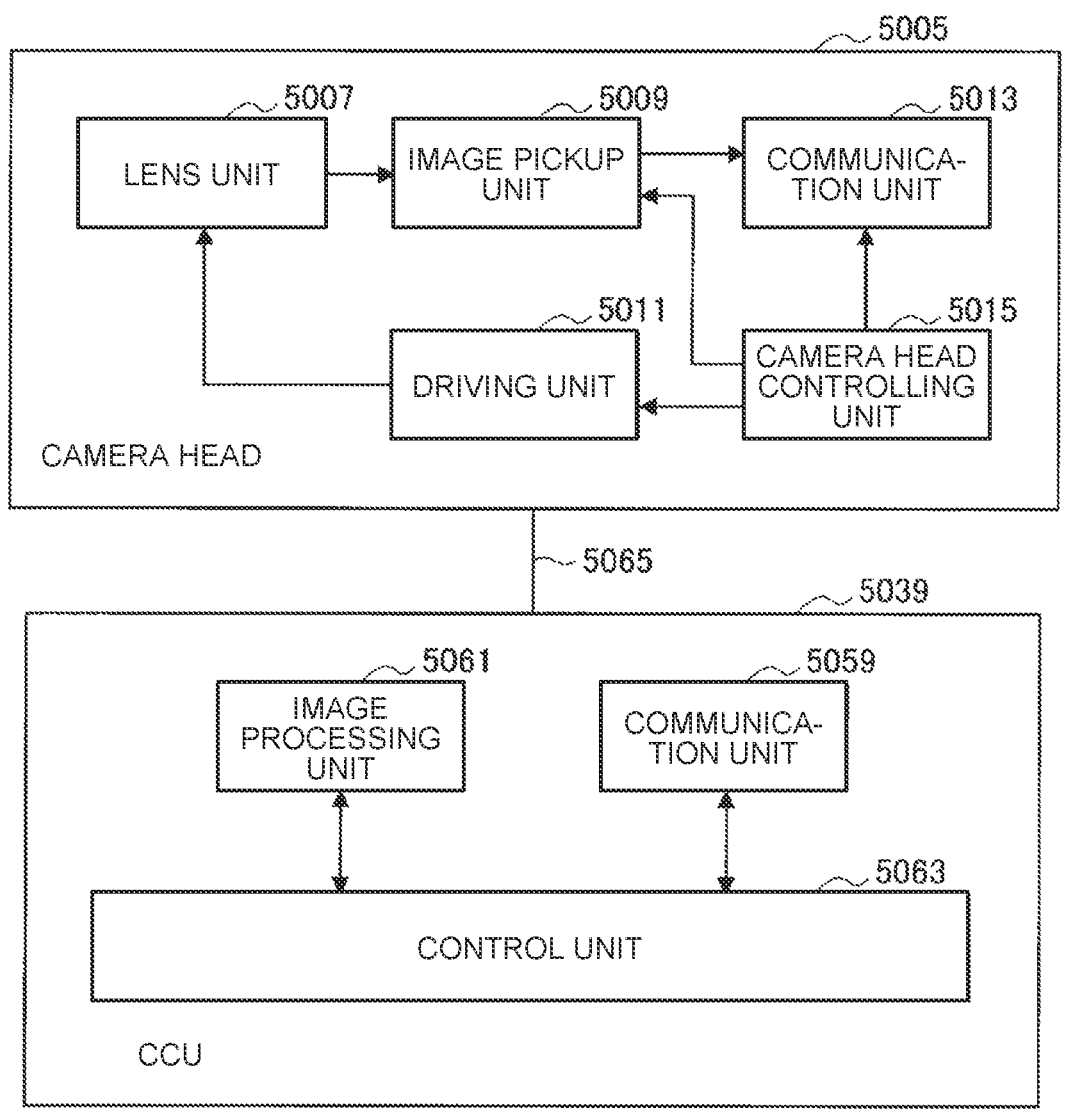
FIG. 18 is a block diagram depicting an example of a functional configuration of a camera head and a camera control unit (CCU) depicted in FIG. 17.

Functions of the camera head 5005 of the endoscope 5001 and the CCU 5039 are described in more detail with reference to FIG. 18. FIG. 18 is a block diagram depicting an example of a functional configuration of the camera head 5005 and the CCU 5039 depicted in FIG. 17.

Referring to FIG. 18, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy treatment tool 5021 is used and so forth by detecting the shape, color and so forth of edges of the objects included in the surgical region image. The control unit 5063 causes, when it controls the display apparatus 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the surgery room. Therefore, such a situation that movement of medical staff in the surgery room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a soft endoscopic system for inspection or a microscopic surgery system.

6. Supplement

Note that the embodiment of the present disclosure described above may include, for example, a processing method executed by the delivery system 10 as described above, a program for causing an apparatus to function, and a non-transitory tangible medium on which the program is recorded. Further, the program may be distributed via a communication line (including wireless communication) such as the Internet.

Furthermore, each step in the processing method of the embodiment of the present disclosure described above may not necessarily be processed in the described order. For example, each step may be processed in an appropriately changed order. In addition, each step may be partially processed in parallel or individually instead of being processed in time series. Furthermore, the processing of each step does not necessarily have to be performed according to the described method, and may be performed by another method by another functional unit, for example.

The preferred embodiment of the present disclosure has been described above with reference to the accompanying drawings, whilst the technical scope of the present disclosure is not limited to the above examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Further, the effects described in the present specification are merely illustrative or exemplified effects, and are not limitative. That is, with or in the place of the above effects, the technology according to the present disclosure may achieve other effects that are clear to those skilled in the art from the description of the present specification.

Additionally, the present disclosure may also be configured as below.

(1) A delivery apparatus comprising:
  a viewpoint information acquisition unit configured to acquire viewpoint information regarding a viewpoint of a user in real-time;
  a rendering unit configured to perform rendering processing on three-dimensional spatial data in real-time on a basis of the viewpoint information to generate two-dimensional video data corresponding to a field of view of the user;
  a parameter generation unit configured to generate an encoding parameter on a basis of a parameter regarding the rendering processing;
  an encoding unit configured to perform encoding processing on the two-dimensional video data in real-time on a basis of the encoding parameter to generate delivering data; and
  a delivery unit configured to deliver the delivering data to a client.

(2) The delivery apparatus according to (1), wherein
  the three-dimensional spatial data includes
  three-dimensional space description data defining a configuration of a three-dimensional space, and
  three-dimensional object data defining a three-dimensional object in the three-dimensional space.

(3) The delivery apparatus according to (2), wherein
  the rendering unit performs the rendering processing in such a way to cause a resolution in the two-dimensional video data to have a distribution, and
  the parameter generation unit generates the encoding parameter on a basis of a resolution map indicating the distribution of the resolution in the two-dimensional video data.

(4) The delivery apparatus according to (3), wherein the rendering unit decides the resolution of the three-dimensional object in the two-dimensional video data depending on a distance from the viewpoint to the three-dimensional object in the three-dimensional space.

(5) The delivery apparatus according to (4), wherein
  the parameter generation unit splits the two-dimensional video data into a plurality of first regions on a basis of the resolution map and assigns a quantization parameter to each of the first regions, generating the encoding parameter, and
  the encoding unit performs the encoding processing on each of the first regions of the two-dimensional video data on a basis of the quantization parameter.

(6) The delivery apparatus according to (5), wherein the parameter generation unit makes the quantization parameter smaller as the resolution increases.

(7) The delivery apparatus according to (5) or (6), wherein
  the parameter generation unit splits the two-dimensional video data into the plurality of first regions along a boundary of each encoding processing unit region in the two-dimensional video data.

(8) The delivery apparatus according to any one of (2) to (7), wherein
  the rendering unit generates occupied region-related information of the three-dimensional object and motion-related information of the three-dimensional object in the two-dimensional video data on a basis of the three-dimensional spatial data and the viewpoint information, and
  the parameter generation unit creates a motion vector map in the two-dimensional video data on a basis of the occupied region-related information and the motion-related information, generating the encoding parameter.

(9) The delivery apparatus according to (8), wherein the parameter generation unit splits the two-dimensional video data into a plurality of second regions and assigns a motion vector to each of the second regions in such a way to correspond to the three-dimensional object on the basis of the occupied region-related information and the motion-related information, creating the motion vector map.

(10) The delivery apparatus according to (8) or (9), wherein the encoding unit executes a search for difference-related information in the two-dimensional video data, with the search executed in a restricted scope on a basis of the motion vector map.

(11) The delivery apparatus according to any one of (8) to (10), wherein
  the rendering unit compares images between consecutive frames in the two-dimensional video data and outputs a comparison result, and
  the encoding unit decides whether or not to encode a following frame between the consecutive frames on a basis of the comparison result.

(12) The delivery apparatus according to any one of (2) to (11), further comprising:
  a three-dimensional space reproduction unit configured to reproduce the three-dimensional space on a basis of the three-dimensional space description data and the three-dimensional object data.

(13) The delivery apparatus according to (12), wherein the rendering unit generates the two-dimensional video data from the reproduced three-dimensional space on the basis of the viewpoint information.

(14) The delivery apparatus according to any one of (1) to (13), wherein the three-dimensional spatial data is omnidirectional video data or spatial video data.

(15) A delivery method comprising:
  acquiring viewpoint information regarding a viewpoint of a user in real-time;
  performing rendering processing on three-dimensional spatial data in real-time on a basis of the viewpoint information to generate two-dimensional video data corresponding to a field of view of the user;
  generating an encoding parameter on a basis of a parameter regarding the rendering processing;
  performing encoding processing on the two-dimensional video data in real-time on a basis of the encoding parameter to generate delivering data; and
  delivering the delivering data to a client.

REFERENCE SIGNS LIST 10, 10a DELIVERY SYSTEM
100 CONTENT SERVER
200 DELIVERY SERVER
202 DATA ACQUISITION UNIT 204, 308, 408, 502, 602 TRANSMITTER-RECEIVER UNIT
300, 400 EDGE SERVER
302, 402, 506 REPRODUCTION UNIT
304, 404, 508 RENDERING UNIT
306, 406 ENCODING UNIT
410, 512, 608 VIEWPOINT INFORMATION ACQUISITION UNIT
412 PARAMETER GENERATION UNIT
500, 600 CLIENT
504, 604 DECODING UNIT
510 SELECTION UNIT
606 CROP UNIT
700 DISPLAY APPARATUS

The invention claimed is:

1. A delivery apparatus, comprising:
a processor configured to;
acquire viewpoint information regarding a viewpoint of a user in real-time;
execute rendering processing on three-dimensional spatial data in real-time based on the viewpoint information to generate two-dimensional video data corresponding to a field of view of the user, wherein the three-dimensional spatial data includes:
three-dimensional space description data defining a configuration of a three-dimensional space, and
three-dimensional object data defining a three-dimensional object in the three-dimensional space;
generate occupied region-related information of the three-dimensional object and motion-related information of the three-dimensional object in the two-dimensional video data based on the three-dimensional spatial data and the viewpoint information;
generate an encoding parameter based on a specific parameter regarding the rendering processing, wherein
the specific parameter corresponds to a motion vector map, and
creation of the motion vector map in the two-dimensional video data is based on the occupied region-related information and the motion-related information;
execute encoding processing on the two-dimensional video data in real-time based on the encoding parameter to generate delivering data; and
deliver the delivering data to a client.

2. The delivery apparatus according to claim 1, wherein the processor is further configured to execute the rendering processing to distribute a resolution in the two-dimensional video data, and
the encoding parameter is generated based on a resolution map indicating the distribution of the resolution in the two-dimensional video data.

3. The delivery apparatus according to claim 2, wherein the processor is further configured to control the resolution of the three-dimensional object in the two-dimensional video data based on a distance from the viewpoint to the three-dimensional object in the three-dimensional space.

4. The delivery apparatus according to claim 3, wherein the encoding parameter is generated based on
split of the two-dimensional video data into a plurality of first regions, wherein the split is based on the resolution map, and
assignment of a quantization parameter to each of the plurality of the first regions; and
the processor is further configured to execute the encoding processing on each of the plurality of the first regions of the two-dimensional video data based on the quantization parameter.

5. The delivery apparatus according to claim 4, wherein the processor is further configured to decrease the quantization parameter as the resolution of the three-dimensional object increases.

6. The delivery apparatus according to claim 4, wherein the processor is further configured to split the two-dimensional video data into the plurality of first regions along a boundary of each encoding processing unit region in the two-dimensional video data.

7. The delivery apparatus according to claim 1, wherein the motion vector map is further created based on:
split of the two-dimensional video data into a plurality of second regions, and
assignment of a motion vector to each of the plurality of second regions, wherein
the motion vector is assigned to correspond to the three-dimensional object based on the occupied region-related information and the motion-related information.

8. The delivery apparatus according to claim 1, wherein the processor is further configured to execute a search for difference-related information in the two-dimensional video data, with the search executed in a restricted scope based on the motion vector map.

9. The delivery apparatus according to claim 1, wherein the processor is further configured to:
compare images between consecutive frames in the two-dimensional video data,
output a comparison result, and
control decision to encode a following frame between the consecutive frames based on the comparison result.

10. The delivery apparatus according to claim 1, wherein the processor is further configured to reproduce the three-dimensional space based on the three-dimensional space description data and the three-dimensional object data.

11. The delivery apparatus according to claim 10, wherein the processor is further configured to generate the two-dimensional video data from the reproduced three-dimensional space based on the viewpoint information.

12. The delivery apparatus according to claim 1, wherein the three-dimensional spatial data is omnidirectional video data or spatial video data.

13. A delivery method, comprising:
acquiring viewpoint information regarding a viewpoint of a user in real-time;
executing rendering processing on three-dimensional spatial data in real-time based on the viewpoint information to generate two-dimensional video data corresponding to a field of view of the user, wherein the three-dimensional spatial data includes:
three-dimensional space description data defining a configuration of a three-dimensional space, and
three-dimensional object data defining a three-dimensional object in the three-dimensional space;
generating occupied region-related information of the three-dimensional object and motion-related information of the three-dimensional object in the two-dimensional video data based on the three-dimensional spatial data and the viewpoint information;
generating an encoding parameter based on a specific parameter regarding the rendering processing, wherein
the specific parameter corresponds to a motion vector map, and creation of the motion vector map in the two-dimensional video data is based on the occupied region-related information and the motion-related information;

encoding the two-dimensional video data in real-time based on the encoding parameter to generate delivering data; and delivering the delivering data to a client.

* * * * *